(12) United States Patent
Zhou et al.

(10) Patent No.: US 7,388,672 B2
(45) Date of Patent: Jun. 17, 2008

(54) HIGH EFFICIENCY BALANCED DETECTION INTERFEROMETER

(75) Inventors: Yan Zhou, Pleasanton, CA (US); Matthew J. Everett, Livermore, CA (US); Martin Hacker, Pleasanton, CA (US)

(73) Assignee: Carl Ziess Meditec, Inc., Dublin, CA (US)

( * ) Notice: Subject to any disclaimer, the term of this patent is extended or adjusted under 35 U.S.C. 154(b) by 342 days.

(21) Appl. No.: 11/264,871

(22) Filed: Nov. 2, 2005

(65) Prior Publication Data

US 2006/0109477 A1  May 25, 2006

Related U.S. Application Data

(60) Provisional application No. 60/629,429, filed on Nov. 19, 2004.

(51) Int. Cl.
*G01B 9/02* (2006.01)
(52) U.S. Cl. .................................... 356/479
(58) Field of Classification Search ............ 356/477, 356/479, 484, 485, 489, 491, 495, 496, 497, 356/511, 512
See application file for complete search history.

(56) References Cited

U.S. PATENT DOCUMENTS

| | | | | |
|---|---|---|---|---|
| 5,268,738 A * | 12/1993 | Baney et al. | ............... | 356/479 |
| 5,321,501 A | 6/1994 | Swanson et al. | ............ | 356/345 |
| 5,459,570 A | 10/1995 | Swanson et al. | ............ | 356/345 |
| 5,491,524 A | 2/1996 | Hellmuth et al. | ............ | 351/212 |
| 5,956,355 A | 9/1999 | Swanson et al. | ............... | 372/20 |
| 6,134,003 A | 10/2000 | Tearney et al. | ............ | 356/345 |
| 6,175,669 B1 | 1/2001 | Colston et al. | ............... | 385/12 |
| 6,198,540 B1 | 3/2001 | Ueda et al. | .................. | 356/479 |
| 6,282,011 B1 | 8/2001 | Tearney et al. | ............ | 359/287 |
| 6,384,915 B1 * | 5/2002 | Everett et al. | ............. | 356/336 |
| 6,608,717 B1 * | 8/2003 | Medford et al. | ............ | 359/368 |
| 6,657,727 B1 | 12/2003 | Izatt et al. | .................. | 356/450 |

(Continued)

FOREIGN PATENT DOCUMENTS

DE        44 03 929 A1       8/1995

(Continued)

OTHER PUBLICATIONS

B.E. Bouma et al., "Power-efficient nonreciprocal interferometer and linear-scanning fiber-optic catheter for optical coherence tomography," *Optics Letters*, vol. 24, No. 8, Apr. 15, 1999, pp. 531-533.

(Continued)

*Primary Examiner*—Patrick Connolly
*Assistant Examiner*—Scott M Richey
(74) *Attorney, Agent, or Firm*—Stallman & Pollock LLP

(57) ABSTRACT

An interferometer configured for use in optical coherence domain (OCT) reflectometry systems is disclosed. In the preferred embodiments, efficient routing of light and a balanced detection arrangement provide a high signal to noise ratio. In a first set of embodiments, a 3×3 coupler is used to split light along separate sample and reference paths and also for combining light returning from those paths and supplying the interfered collected light to the detection system. In an alternate set of embodiments, a pair of cascaded 2×2 couplers provides a similar function. The interferometer can be used with various OCT modalities including time-domain and frequency domain approaches.

28 Claims, 18 Drawing Sheets

U.S. PATENT DOCUMENTS

| | | | | |
|---|---|---|---|---|
| 6,687,008 | B1 | 2/2004 | Peale et al. | 356/477 |
| 7,126,693 | B2* | 10/2006 | Everett et al. | 356/479 |
| 7,256,894 | B2* | 8/2007 | Chen et al. | 356/497 |
| 7,330,270 | B2* | 2/2008 | O'Hara et al. | 356/479 |
| 2003/0156296 | A1 | 8/2003 | Englund et al. | 356/477 |
| 2004/0239938 | A1* | 12/2004 | Izatt | 356/450 |
| 2004/0239943 | A1 | 12/2004 | Izatt et al. | 356/479 |
| 2005/0213103 | A1 | 9/2005 | Everett et al. | 356/479 |
| 2006/0093276 | A1* | 5/2006 | Bouma et al. | 385/72 |
| 2007/0076217 | A1* | 4/2007 | Baker et al. | 356/498 |

FOREIGN PATENT DOCUMENTS

EP  1 253 398 A1  10/2002

OTHER PUBLICATIONS

J.G. Fujimoto, "Optical coherence tomography for ultrahigh resolution in vivo imaging," *Nature Biotechnology*, vol. 21, No. 11, Nov. 2003, pp. 1361-1367.

J.G. Fujimoto et al., "Optical Coherence Tomography: An Emerging Technology for Biomedical Imaging and Optical Biopsy," *Neoplasia*, vol. 2, Nos. 1-2, Jan.-Apr. 2000, pp. 9-25.

D. Huang, et al., "Optical Coherence Tomography," *Science*, vol. 254, No. 5035, Nov. 22, 1991, pp. 1178-1181.

K. Takada, "Noise in Optical Low-Coherence Reflectometry," *IEEE Journal of Quantum Electronics*, vol. 34, No. 7, Jul. 1998, pp. 1098-1108.

M.A. Choma et al., "Instantaneous quadrature low-coherence interferometry with 3×3 fiber-optic couplers," *Optics Letters*, vol. 28, No. 22, Nov. 15, 2003, pp. 2162-2164.

A.M. Rollins et al., "Optimal interferometer designs for optical coherence tomography," *Optics Letters*, vol. 24, No. 21, Nov. 1, 1999, pp. 1484-1486.

M.C. Tomic et al., "Low-coherence interferometric method for measurement of displacement based on a 3×3 fibre-optic directional coupler," *Journal of Optics A: Pure and Applied Optics*, vol. 4, (2002), pp. S381-S386.

M.V. Sarunic et al., "Instantaneous complex spectral domain OCT using 3×3 fiber couplers," *Proceedings of SPIE—Coherence Domain Optical Methods and Optical Coherence Tomography in Biomedicine VIII* (Bellingham, WA), vol. 5316, (2004), pp. 241-247.

A.M. Rollins et al., "Emerging Clinical Applications of Optical Coherence Tomography," *Optics and Photonics News*, vol. 13, No. 4, Apr. 2002, pp. 36-41.

J.M. Schmitt, "Optical Coherence Tomography (OCT): A Review" *IEEE Journal of Selected Topics in Quantum Electronics*, vol. 5, No. 4, Jul./Aug. 1999, pp. 1205-1215.

W.V. Sorin et al., "A Simple Intensity Noise Reduction Technique for Optical Low-Coherence Reflectometry," *IEEE Photonics Technology Letters*, vol. 4, No. 12, Dec. 1992, pp. 1404-1406.

E. A. Swanson et al., "Optical Coherence Tomography, Principles, Instrumentation, and Biological Applications," *Biomedical Optical Instrumentation and Laser-Assisted Biotechnology*, A. M. Verga Scheggi et al. (eds.) pp. 291-303, 1996 Kluwer Academic Publishers, Printed in the Netherlands.

R.C. Youngquist et al., "Optical coherence-domain reflectometry: a new optical evaluation technique," *Optics Letters*, vol. 12, No. 3, Mar. 1987, pp. 158-160.

S. Yazdanfar et al., "Self-referenced Doppler optical coherence tomography," *Optics Letters*, vol. 27, No. 23, pp. 2085-2087.

* cited by examiner (a)

(b)

(a)

(b)

HIGH EFFICIENCY BALANCED DETECTION INTERFEROMETER

PRIORITY CLAIM PROVISIONAL

This patent application claims priority to U.S. Provisional Patent Application No. 60/629,429, filed Nov. 19, 2004, which is incorporated herein by reference.

BACKGROUND OF THE INVENTION

1. Field of the Invention

The invention relates generally to optical imaging using optical coherence tomography and in particular to systems and methods for achieving balanced detection with high signal to noise ratio.

2. Description of Related Art

Optical coherence domain reflectometry (OCDR) is a technique initially developed to provide a higher resolution over optical time domain reflectometry (OTDR) for the characterization of the position and the magnitude of reflection sites in such optical assemblies as optical fiber based systems, miniature optical components and integrated optics (Youngquist et al., "Optical Coherence-Domain Reflectometry: A New Optical Evaluation Technique", 1987, Optics Letters 12(3):158-160). With the addition of transverse scanning, this technique has been widely and successfully extended to the imaging of biological tissues, and is termed optical coherence tomography (OCT) (Huang, D., E. A. Swanson, et al. (1991). "Optical coherence tomography." Science 254 (5035): 1178-81; and U.S. Pat. Nos. 5,321,501 and 5,459,570). Since then, a large of number of applications have been found for this technology as evidenced by a number of review articles (Swanson E. A. et al. "Optical coherence tomography, Principles, instrumentation, and biological applications" Biomedical Optical Instrumentation and Laser-Assisted Biotechnology, A. M. Verga Scheggi et al. (eds.) pages: 291-303, 1996 Kluwer Academic Publishers, Printed in the Netherlands; Schmitt, J. M. "Optical coherence tomography (OCT): a review" IEEE Journal of Selected Topics in Quantum Electronics, Volume: 5, Issue: 4, Year: July/August 1999 pages: 1205-1215; Fujimoto, J. G. et al. "Optical Coherence Tomography: An Emerging Technology for Biomedical Imaging and Optical Biopsy" *Neoplasia* (2000) 2, 9-25; Rollins A. M. et al. "Emerging Clinical Applications of Optical Coherence Tomography" Optics and Photonics News, Volume 13, Issue 4, 36-41, April 2002; Fujimoto, J. G. "Optical coherence tomography for ultrahigh resolution in vivo imaging." *Nat Biotechnol* 21(11): 1361-7, (2003)).

The U.S. Patents cited above as well as those cited throughout this patent application are incorporated herein by reference.

The traditional interferometer configuration for OCDR or OCT is a standard Michelson interferometer. As shown in FIG. 1, light from a broadband, or frequency-tunable, source 10 is input into a beam splitter or 2×2 fiber optic coupler 12, where the light is split and directed into a sample arm 14 and a reference arm 16. An optical fiber 18 in the sample arm 14 extends into a device 20 that scans an object 22 with a beam of light. The reference arm 16 provides a variable optical delay. Light input into the reference arm 16 is reflected back by a reference mirror 24. A piezoelectric modulator 26 may be included in the reference arm 16 with a fixed reference mirror 24, or the modulator 26 may be eliminated by scanning the mirror 24 in the Z-direction. The reflected reference beam from reference arm 16 and the scattered sample beam from sample arm 14 pass back through the coupler 12 to detector 28 (including processing electronics), which processes the signals by techniques known in the art to produce a backscatter profile or image on a display unit 30.

This configuration is advantageous in that it uses a minimum number of optical components and is hence the simplest. It can be implemented using bulk or fiber optics or a combination thereof. However, this configuration is limited to an optical efficiency of 25% as explained below.

By examining the configuration, it is not difficult to discover that the optical power reaching the detector from the two arms is reciprocal with respect to the beam splitter or fiber coupler (BS/FC). Assuming that the power split ratio of the beam splitter is $$\frac{\alpha}{1-\alpha}$$

and neglecting loss in the splitter, the attenuation by the beam splitter or the fiber coupler (BS/FC) to both the sample optical wave and the reference optical wave is the same and is equal to $\alpha(1-\alpha)$. The only difference is that for one wave it will propagate straight-through the BS/FC first with an attenuation caused by a transmission factor of $(1-\alpha)$ and then crossover the BS/FC with a further attenuation by a factor of $\alpha$, whereas for the other wave, it will crossover the BS/FC first with an attenuation by a factor of $\alpha$ and then propagate straight-through the BS/FC with a further attenuation by a factor of $(1-\alpha)$. It is well known that for such a configuration, the most efficient power splitting ratio is 50/50, where $$\frac{\alpha}{1-\alpha} = 1,$$

simply because the function $\alpha(1-\alpha)$ has its maximum value when $\alpha=0.5$.

Due to the fact that the optical power reflected or scattered back from a biological sample is generally a few orders of magnitude less than the incident power, the reference arm optical power needs to be attenuated by two or more orders of magnitude to improve the signal to noise ratio [Sorin, W. V. et al. (1992) "A simple intensity noise reduction technique for optical low-coherence reflectometry." *Photonics Technology Letters IEEE* 4(12): 1404-1406]. Otherwise, the signal will be degraded by the optical power noise of the source. Hence virtually 75% of the optical power supplied by the light source is wasted in this configuration.

Another issue with the classic Michelson interferometer (FIG. 1) is that light from the reference arm is coupled back into the optical source, causing side effects that can impact the quality of the resulting image.

In order to improve the optical power efficiency, use of circulator(s) in the sample arm, the reference arm and also in the source arm was disclosed in U.S. Pat. Nos. 6,134,003, 5,956,355, 6,175,669, 6,384,915 and in B. E. Bouma and G. J. Tearney (1999). "Power-efficient nonreciprocal interferometer and linear-scanning fiber-optic catheter for optical coherence tomography." *Optics Letters* 24(8): 531-533. A summary was given by Rollins and Izatt [U.S. Pat No. 6,657,727; A. M. Rollins and J. A. Izatt "Optimal interferometer designs for optical coherence tomography" Optics Letters, Vol. 24 Issue 21 Page 1484 (1999)]. As shown in FIG. 2, a key optical element that is used in these configurations is an optical circulator and such a circulator can be combined with unbalanced couplers, and (or) balanced heterodyne detection for optical power efficient interferometer construction. FIG. 2 encompasses 6 configurations where the three insets basically show a modification from the three corresponding balanced heterodyne detection employing balanced couplers to a single detector based detection employing unbalanced coupler(s). The first two configurations (Ai and Aii) are based on a Mach-Zehnder interferometer with the sample located in a sample arm and the reference optical delay line (ODL) in the other reference arm. The main difference between Ai and the standard Mach-Zehnder interferometer (MZ-interferometer) is that the prior fiber coupler, i.e. the fiber coupler between source and sample, has an optical power split ratio of $$\frac{\alpha_1}{1-\alpha_1}$$

instead of 50/50. This ratio can be optimized for optical power efficient high SNR detection by directing most of the original optical power to the sample arm. Meanwhile light is coupled to the sample through an optical circulator such that the backscattered optical signal is redirected to a different path containing a "post" fiber coupler. The reference arm ODL may be either transmissive or retroreflective (see U.S. Pat. No. 6,657,727). Note that in Ai, the post fiber coupler has a split ratio of 50/50 and due to the employment of balanced heterodyne detection, the SNR of Ai can be improved over that of a standard Michelson configuration as shown in FIG. 1 by 8 dB. However, due to the fact that a practical fast-scanning optical delay line operates in reflection mode, a second circulator is needed, and this will increase the cost of the system.

In configuration Aii, the post fiber coupler is also made unbalanced and a single detector is used. By properly controlling the optical power split ratio of both the prior fiber coupler and the post fiber coupler, a theoretical SNR improvement of 2 dB over the standard Michelson interferometer of FIG. 1 can be achieved. The advantage of Aii as compared to Ai is that since only one detector is used, the cost of the system will be lower than that of Ai.

Refer now to Bi and Bii, while the sample arm part is the same as in Ai and Aii, the reference arm ODL is made retroreflective. Note, to use a retroreflective ODL instead of a transmissive ODL in Ai and Aii would require a second circulator. Again, the optical power split ratio of both the prior fiber coupler and the post fiber coupler, $$\frac{\alpha_1}{1-\alpha_1} \text{ and } \frac{\alpha_2}{1-\alpha_2},$$

can be properly chosen for either the two detector based balanced heterodyne detection case or the unbalanced single detector case to optimize the SNR such that the system is optical power efficient. Izatt and Rollin showed that the SNR improvement of Bi and Bii is very similar to that of Ai and Aii. Note that there will be a small portion of the optical power from the reference ODL being returned to the light source path.

Configuration Ci and Cii are variations on the standard Michelson interferometer. Their difference as compared to FIG. 1 is the use of an optical circulator in between the light source and the fiber coupler to channel the returned light from the fiber coupler to the detector, d2. While for balanced heterodyne detection (Ci), the optical power split ratio of the fiber coupler must be made 50/50, it should be noted that for the case of single-detector unbalanced detection (Cii), the optical power delivered to detector d2 from the sample arm and the power from the reference arm can be made different. The sample optical signal will propagate straight through the fiber coupler twice and the reference optical signal will cross over the fiber coupler twice. As a result, the optical power delivery to detector d2 can be made efficient by properly selecting the fiber coupler optical power split ratio $$\frac{\alpha}{1-\alpha}.$$

Izatt and Rollin stated that for Ci, the SNR can be improved over that of FIG. 1 and although this configuration is not as power efficient as the other two, i.e. Ai and Bi, its significant advantage is that it can be easily retrofitted with a circulator in the source arm and with a balanced receiver, with no need to disturb the rest of the system. As for Cii, the SNR improvement is similar to that of Aii and Bii.

It can be seen from the above-mentioned configurations that the key advantage of these prior art configurations lies in the improvement of the optical power delivery efficiency to the detector(s), by properly selecting an optical power split ratio $$\frac{\alpha}{1-\alpha}$$

(for either the prior and/or the post fiber coupler). However, in the case of Ai and Aii, although the SNR is maximized, if a retroreflective ODL is desired in these configurations, a second circulator would be necessary which will increase the cost of the system. With the configuration of Bi and Bii, there will be a certain amount of light being channeled back to the source. At the same time, for Ai, Aii, Bi and Bii, there are always two 1×2 or 2×2 directional couplers used and if one needs to monitor the source power, another 1×2 or 2×2 tap coupler needs to be added to the system. The system hence costs more and is not very compact. For the cases of Ci and Cii, although the system is compact as there is only one 2×2 coupler, the optical power efficiency is not fully maximized as the power splitting ratio of the coupler must be made 50/50 for returned dual balanced detection, which will also force the forward split ratio to be 50/50. As a result, attenuation in the reference arm is needed to achieve shot noise limited detection and this will waste optical power.

Attempts have been made to use polarization dependent component(s) and/or coupler(s) to unevenly split the forward propagating optical power and evenly split the backward propagating optical waves. But these schemes generally require a complicated polarization dependent splitter design and are not very suitable for biological samples with varying birefringence [EP1253398, U.S. patent Application No.: 2005/0213103].

In this invention, a single monolithic 3×3 coupler is combined with a circulator in a looped sample path to realize almost all the advantages of a polarization independent high power efficiency and high SNR scheme. This configuration makes the system more compact and less costly. In addition, the fourth port of the circulator can be used for optical power monitoring of the source, which can further save the space and cost of a tap coupler. Alternatively, such a 3×3 coupler can also be mimicked by cascading two 2×2 couplers, which offers almost the same SNR advantage as that of the monolithic 3×3 coupler design.

It should be noted that although there are reports on using 3×3 couplers for optical coherence interferometry, in these prior art systems, the 3×3 coupler has an equal power split ratio for the three ports and the use of such a symmetric 3×3 coupler is meant for achieving simultaneous 3-phase detection rather than for optimizing optical power efficiency. [M. A. Choma, et al. (2003). "Instantaneous quadrature low-coherence interferometry with 3×3 fiber-optic couplers." Optics Letters 28(22): 2162; DE 4403929A1; M. C. Tomic, et al. "Low-coherence interferometric method for measurement of displacement based on a 3×3 fibre-optic directional coupler" J. Opt. A: Pure Appl. Opt. 4 (2002) S381-S386; M. V. Sarunic, et al. "Instantaneous complex spectral domain OCT using 3×3 fiber couplers" SPIE Vol. 5316, p 241-247]

DETAILED DESCRIPTION OF THE INVENTION

The present invention is an optical interferometry system employing a circulator in a looped sample path with a monolithic 3×3 coupler, while keeping the reference optical delay line (ODL) retroreflective. Such a configuration offers a number of advantages especially to an OCT system. The most unique feature is that it uses only one coupler to achieve both an optimal forward split ratio and also a nearly 50/50 backward split ratio. Consequently, most of the optical power from the source can be delivered to the sample and meanwhile it ensures that the return sample light and the return reference light are recombined in a nearly 50/50 coupling manner so that balanced detection is realized. As a result, a SNR approaching that of the highest achievable value can be achieved.

As an alternative, another configuration consisting of two 2×2 couplers in cascade is also disclosed. This configuration is different from the monolithic 3×3 coupler configuration in terms of the different phase and intensity relationships of the two interfered light waves that are used for dual balanced detection, but can in principle also achieve a similar effect as in the monolithic 3×3 coupler case.

Embodiment 1

Figure 3A:
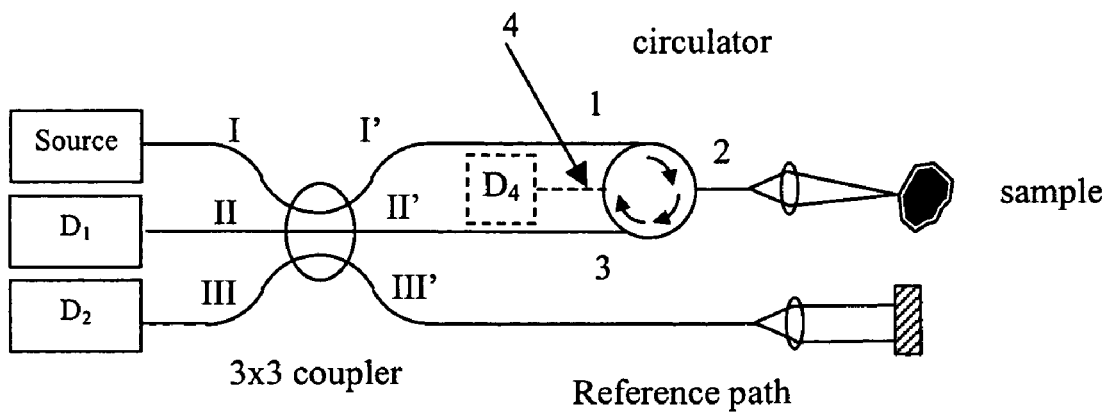
FIG. 3 is a schematic block diagram of a first embodiment of the present invention using a 3×3 coupler and a circulator.

FIG. 3a shows a first embodiment of the present invention. The light source introduces to the system a light wave. The light source can be any tunable, narrowband, or broadband light source having a center wavelength within the optical spectrum range from ultra-violet to near infrared. It is preferably derived from a laser, a tunable laser, a superluminescent diode (SLD), a light emitting diode (LED), a short pulsed laser such as a Ti:sapphire laser, a photonic crystal fiber laser or a spontaneous emission based rare earth doped optical fiber broad band light source. The light source is coupled to an input port (port I) of a monolithic 3×3 fiber coupler. A 3×3 coupler has a first set of three ports and a second set of three ports, and has the property that some light entering any port in first set is coupled to each port in the second set. For example a fused junction between three fibers is an example of a 3×3 coupler. It is preferred but not absolutely required that the 3×3 coupler is a non-equal split ratio monolithic coupler so that most of the input optical power from the source is channeled to one output port (port I') of the 3×3 coupler. Meanwhile a small portion of the input optical power is also channeled to the other two output ports (port II' and port III') of the 3×3 coupler.

For the sample light wave, the output port I' of the 3×3 coupler is connected to the input port (port 1) of a circulator. Note that the circulator can be either a 3-port circulator or a 4-port circulator. Port 2 of the circulator is a combination output/input port. Light from port 2 of the circulator is guided through a certain length of a fiber to the sample. A probe module may be used to enable light beam manipulation such as collimation, focusing, scanning etc. and light scattered back or reflected from the sample is collected and guided through the same probe module back to port 2 of the circulator. As port 2 of the circulator is a combination output/input port, the returned light from the sample will be circulated and directed to port 3 of the circulator which is connected to port II' of the 3×3 coupler. As a result, the sample path is looped back to the same coupler. At the coupling region of the 3×3 coupler, the returned light from the sample is preferably substantially equally split into port II and port III of the 3×3 coupler with only a minimum amount of light being channeled back to the source arm. Meanwhile, the returned sample light interferes with the reference light wave returned from the reference arm.

Substantially equal splitting of power between port II and port III also provides interference signals at these ports with substantially 180 degrees difference in the phase between reference and sample light; this in turn allows dual balanced detection to extract the interference signal and largely reject fluctuations in reference power. The signals from the two detectors D1 and D2, which are connected respectively to port II and port III of the 3×3 coupler, can be subtracted to implement dual balanced detection.

The reference light wave from port III' of the 3×3 coupler is connected through a certain length of an optical fiber to a retroreflective module, which include, but is not limited to, an optical delay line (ODL) such as the grating based optical delay line (ODL) as disclosed in patents U.S. Pat. Nos. 5,491,524 and 6,282,011, as well as those employing corner mirror(s) or corner prism cube(s) as described in U.S. Pat. Nos. 5,459,570 and 5,321,501. In the case of an OCT system, given a path length scan range, one can match the total optical path length between the sample and the reference arms to enable a large longitudinal scan or data capturing dynamic range. Light returned from the retroreflective module is guided through the same fiber back to port III' of the 3×3 coupler and at the coupling region, this returned reference light is most preferably substantially equally split into port II and port III of the 3×3 coupler in a way similar to that of the sample light wave and interferes with the returned sample light. Again, there will be a minimum amount of light being coupled back to the source arm of the 3×3 coupler.

It should be noted that there is also a small amount of light from the source being directed through output port II' of the 3×3 coupler to port 3 of the circulator. If the circulator is a 3-port circulator, this small amount of light will be lost but will not be directed to the sample or back to the source arm due to the circulating property of the circulator. On the other hand, if the circulator is a 4-port circulator, this small amount of light will be channeled to port 4 of the circulator which can be connected to a detector for source power monitoring. With this, there is no need to include an additional tap coupler in the source arm or somewhere else in the configuration to monitor the source power as required because of safety or light source power fluctuation concerns.

From the above discussion, it can be seen that the key requirement for the 3×3 coupler is that for forward light propagation, most of the optical power should be channeled via the monolithic 3×3 coupler's output port I' to the sample optical path. Further, when the sample light looped back from the circulator and the reference light directly reflected back from the reference retroreflective module are recombined at the coupling region of the monolithic 3×3 coupler, the power split ratio for these two channels should be made close to 50/50 to enable a nearly balanced detection scheme. Such a monolithic 3×3 coupler can be made by arranging the three optical waveguides within the coupling region in a non-symmetric manner. In general, there is a minimum amount of light being coupled back to the source arm of the 3×3 coupler for both the returned sample light and the returned reference light and in most practical cases, this amount can be made small enough not to influence the operation of the light source, hence it should not be a concern. As an alternative, this returned light to the source arm can be blocked by incorporating an isolator in the source arm or a circulator in the source arm and used for better signal processing as will be elaborated for embodiment 3 and 4.

Figure 3B:
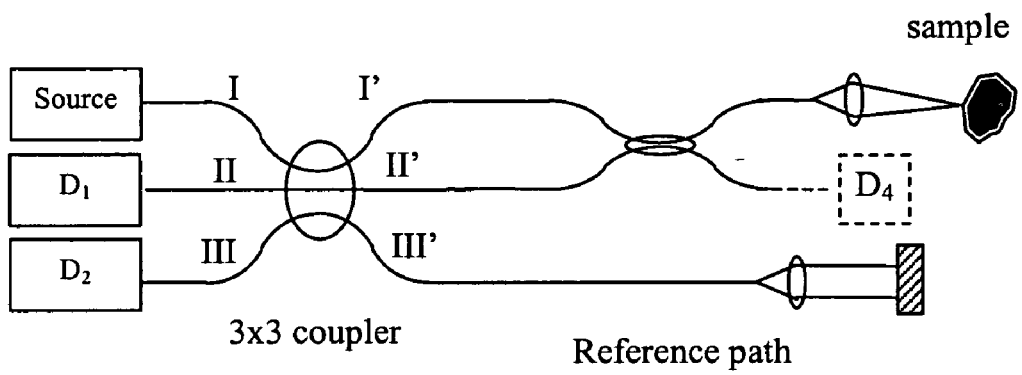

Other optical assemblies can be used in place of the circulator in the present invention. For example, a fiber-based or bulk-optical 2×2 beam-splitter can be used in the manner disclosed in FIG. 3 of U.S. Pat. No. 5,459,570, in which beam-splitter 66 performs a function analogous to that of the circulator in the present invention. FIG. 3b shows the use of a fiber-based beam-splitter in the present invention. The use of a beam-splitter or fiber coupler instead of a circulator makes less efficient use of light, for the same reasons as described in relation to FIG. 1. Therefore the circulator embodiment of FIG. 3a is preferred when optical power is limited. In cases where source optical power is not limited, the embodiment of FIG. 3b can efficiently collect light from the sample if the split ratio of the 2×2 beam-splitter is adjusted to route most of the light reflected from the sample to port II' of the 3×3 coupler.

Figure 3C:
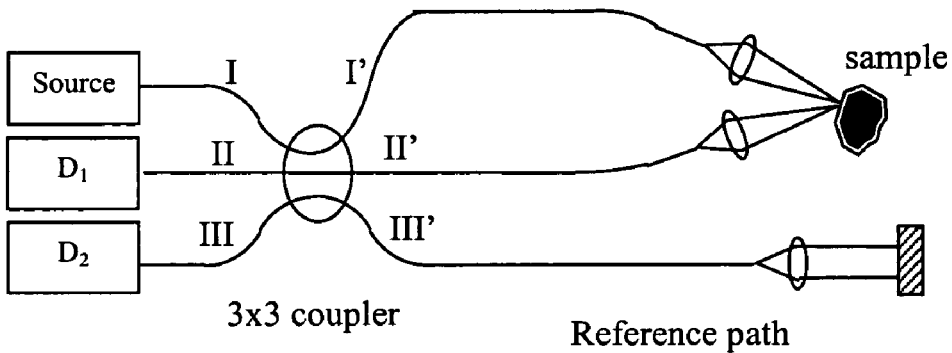

As an alternative to the beam-splitter shown in FIG. 3b, free-space optics can perform the same function as shown in FIG. 3c. This implementation, however, does not provide a port for the power monitor D4.

Figure 2:
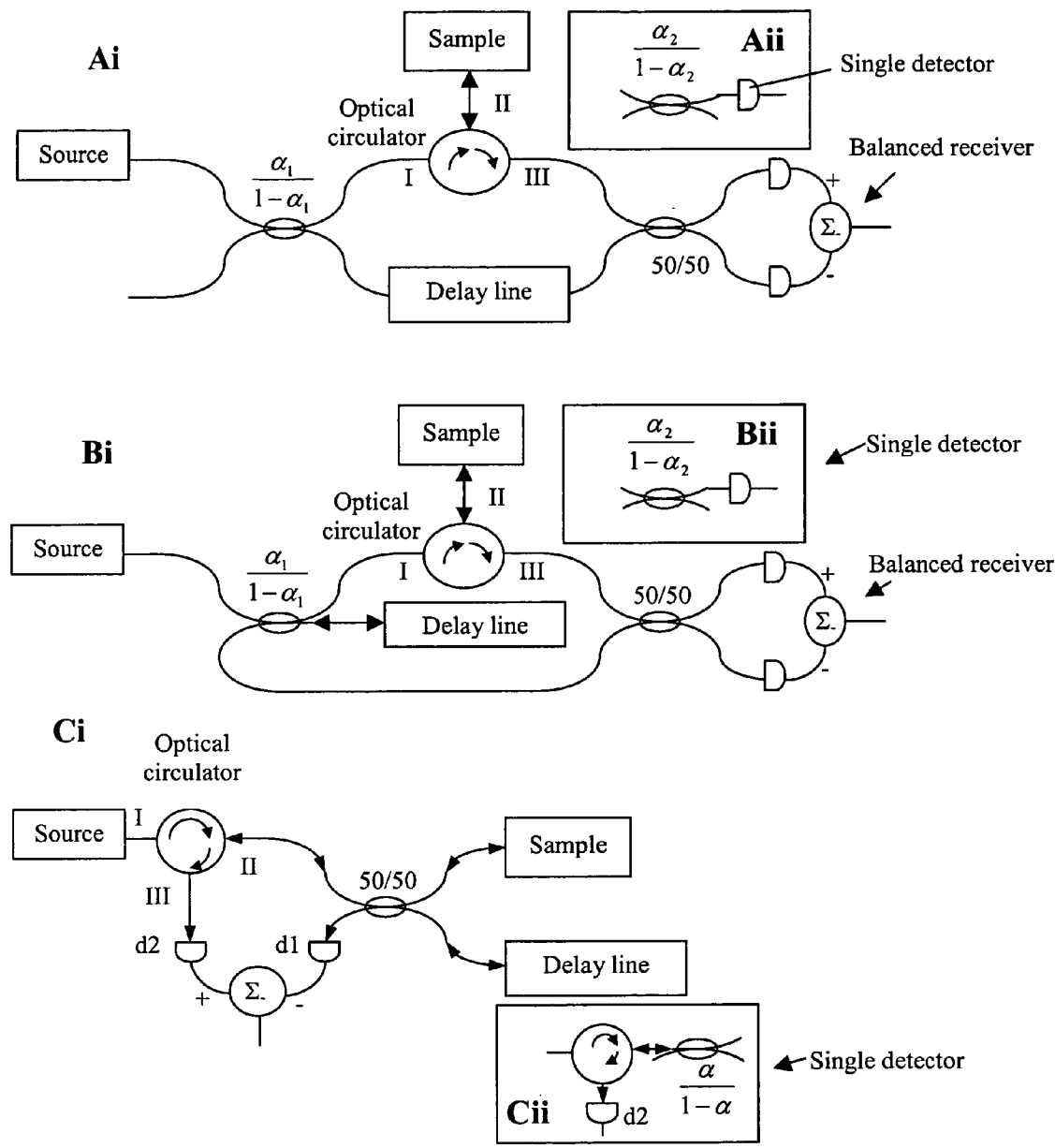
FIG. 2 illustrates three improved interferometers for OCT, as are known in the art.

As shown in the insets to FIG. 2, the interferometer can be adapted to use only one detector. The split ratio for the outputs II and III can be adjusted to favor one of the two detectors D1 or D2, and the other detector can be eliminated. Use of only one detector has the advantage of cost reduction, which can be significant in the case of spectral-domain OCT, for example, where array detectors are used. Polarization control is often used on optical coherence tomography to approximately match polarizations of the light returned from the sample and reference paths, so as to maximize the resulting interference signal. The interferometers of the present invention allow polarization control in either sample or reference paths by various means known in the art, including fiber-loops in sections of the optical paths implemented in optical fiber, optically active materials that rotate the polarization of light, and waveplates in free-space sections of the optical paths.

Variable delay devices are often used in optical coherence tomography to adjust the depth range of imaging. Delay devices known in the art, such as fiber-stretchers and folded free-space optical paths including moveable mirrors, can be included in either sample or reference paths of the present invention.

In any of these embodiments, fixed or variable attenuation can be provided in the reference path to optimize the signal to noise ratio as described by Sorin et al. [*Photonics Technology Letters, IEEE* 4(12): 1404-1406]. Fixed or variable attenuation in the sample path can be used to allow measurement of highly-reflecting samples.

The various interferometers disclosed herein can be used in any of the various methods of OCT. In time-domain OCT, as described in U.S. Pat. No. 5,321,501, the reference arm length is swept, or a frequency shift is introduced into either the sample beam or reference beam. In spectral domain OCT, as illustrated in FIG. 18 of in U.S. Pat. No. 6,134,003, one uses a detector or detectors capable of spectrally dispersing the interfered light. In swept-source OCT, as described in U.S. Pat. No. 5,956,355, one uses a frequency-swept optical source. Advanced techniques of OCT detection including Doppler OCT and polarization-diversity OCT (Yazdanfar, S. and J. A. Izatt "Self-referenced Doppler optical coherence tomography." *Optics Letters* 27(23): 2085-2087) are compatible with the various interferometers disclosed herein.

Embodiment 2

Figure 4:
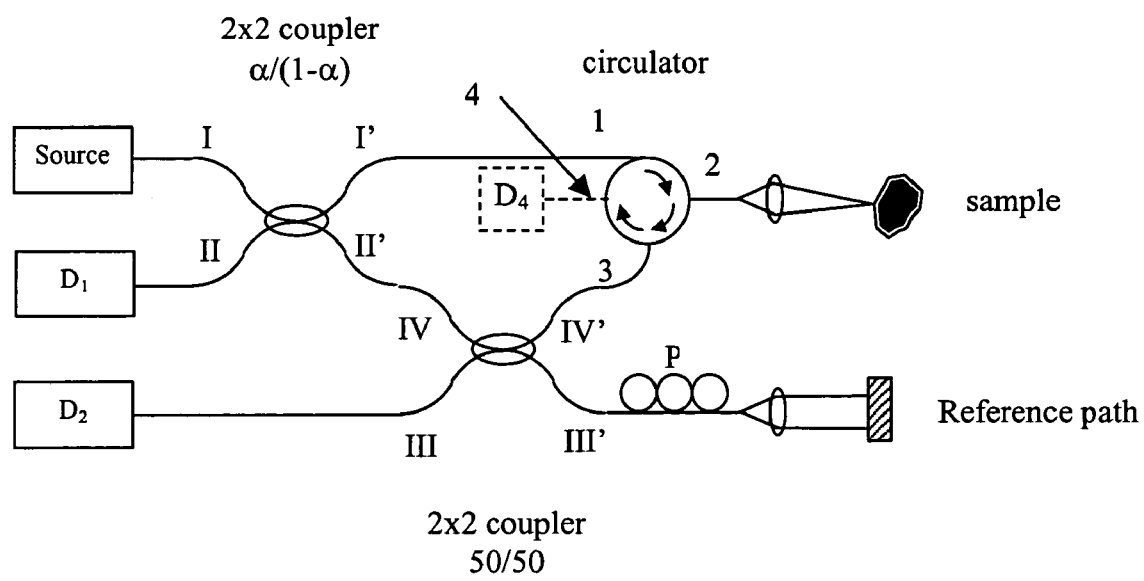
FIG. 4 is a schematic block diagram of a second embodiment 2 of the present invention using two cascaded 2×2 couplers and a circulator.

FIG. 4 shows another embodiment, in which two 2×2 couplers are connected in cascade. A 2×2 coupler has a first pair of ports and a second pair of ports, and has the property that some light entering any port in first set is coupled to each port in the second set. For example a fused junction between two fibers is an example of a 2×2 coupler. Another example of a 2×2 coupler is a plate beam-splitter. The net effect of this configuration is similar to that of embodiment 1. We will not repeat similar descriptions but rather highlight the differences. The key differences include the following: the first 2×2 coupler directly connected to the source is preferably an uneven split ratio coupler that channels most of the light to the sample path wherein light returned from the sample is channeled via the circulator to another 2×2 coupler that has a 50/50 split ratio; while the 50/50 coupler ensures that the interfered light waves in the two arms leading to detectors D1 and D2 are 180 degrees out of phase. The fact that there is a small amount of light being coupled back to the source arm via the uneven split ratio 2×2 coupler would mean that the two interfered light waves propagating towards detector D1 and D2 do not have the matched intensity required for perfect balanced detection. Hence, there might be a need to slightly attenuate the light wave in the arm leading to detector D2 or a different electronic gain for the two detectors may be needed. It should be noted that in fact this should not be of a major concern as in many cases of dual balanced detection, it is difficult to guarantee a perfect balance or a perfect 50/50 coupling any way and it is not uncommon for fine adjustment in terms of attenuating the optical power in one of the two arms leading to the two detectors or achieving the same effect electronically.

Polarization control is often used on optical coherence tomography to approximately match polarizations of the light returned from the sample and reference paths, so as to maximize the resulting interference signal. The interferometers of the present invention allow polarization control in either sample or reference paths by various means known in the art, including fiber-loops in sections of the optical paths implemented in optical fiber, optically active materials that rotate the polarization of light, and waveplates in free-space sections of the optical paths. For example, FIG. 4 shows the use of a fiber-loop paddle P in the reference path as a way of polarization adjustment.

Variable delay devices are often used in optical coherence tomography to adjust the depth range of imaging. Delay devices known in the art, such as fiber-stretchers and folded free-space optical paths including moveable mirrors, can be included in either sample or reference paths of the present invention.

As can be appreciated, port IV' of the 50/50 coupler corresponds to port II' of the 3×3 coupler of the FIG. 3 embodiment.

The modifications of the sample path illustrated in FIGS. 3b and 3c can be applied in the same manner to the embodiment of FIG. 4.

Again, the interferometer can be adapted to use only one detector in a manner analogous to that shown in FIG. 2. The split ratio for the outputs II and IV can be adjusted to favor the one detector that is retained.

Embodiments 3 and 4

As can be seen from embodiment 1 and embodiment 2, in order to ensure a dual balanced detection, strictly speaking, the split ratio of the recombining coupler for the returned sample wave and reference wave must be kept at 50/50 and there should be most preferably no more attenuation to either of the two interfered waves. In the case of embodiment 1, due to the fact that there is a small amount of recombined light being coupled at the coupling region back to the source arm, the phase relationship between the two interfered light waves propagating to detector D1 and detector D2 is not exactly 180 degrees out of phase but only close to this value. In the case of embodiment 2, although the relative phase relationship of the two light waves propagating to detector D1 and detector D2 is exactly 180 degrees out of phase for the case of a perfect 50/50 recombining coupler, the interfered light wave propagating to detector D1 is attenuated more than that propagating to detector D2. Due to the fact that a real coupler cannot always offer an exact 50/50 split ratio and the fact that the small amount of light propagating backward to the source is undesirable, a solution to this issue is to put an additional circulator in the source arm. The first benefit is that it will remove even the small amount of light that returns back to the source and hence increase the performance of the light source. More beneficially, this additional circulator can enable us to channel the light wave initially returning to the source arm to another detector D3. D3 can be used for generating a third interfered signal that can be combined with the signals from detectors D1 and D2 for a full signal recovery to yield the highest SNR as for the case of a perfect dual balanced detection scheme.

Figure 5:
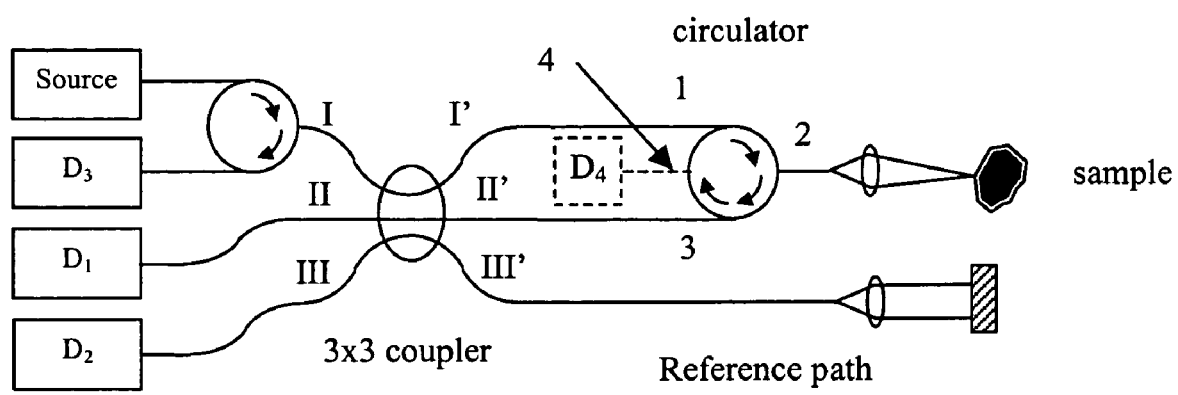
FIG. 5 is a schematic block diagram of a third embodiment 3 of the present invention using a 3×3 coupler and two circulators.
Figure 6:
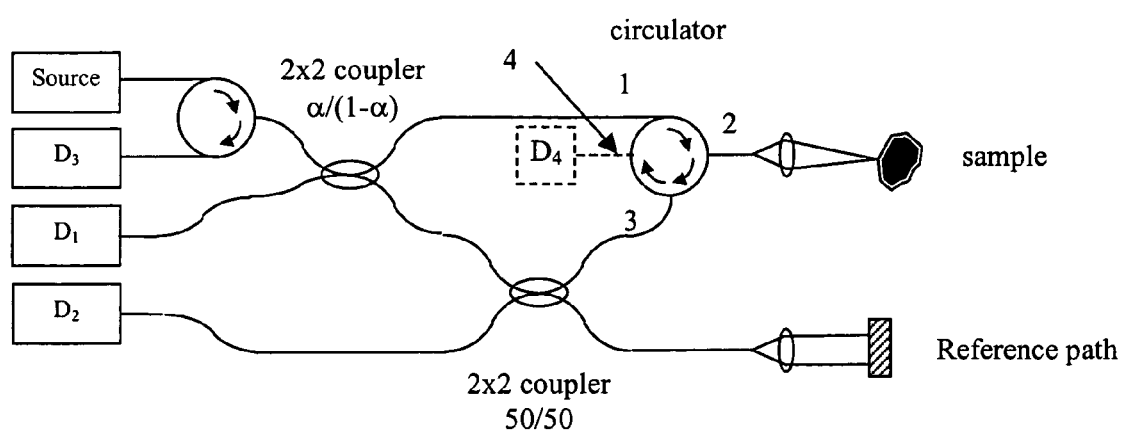
FIG. 6 is a schematic block diagram of a fourth embodiment of the present invention using two cascaded 2×2 couplers two and circulators.

The corresponding embodiment 3 and 4 are shown in FIG. 5 and FIG. 6, respectively. Although this additional circulator will increase the cost of the system, it can provide other advantages. For example, the requirement for a substantially 50/50 split ratio for recombining the returned sample and reference light waves is no longer absolutely required. This might be more beneficial to the monolithic 3×3 coupler case of FIG. 5 as a 3×3 monolithic coupler inherently cannot provide an exact 50/50 split ratio for the returned sample and reference light waves. Secondly, the fact that there is no longer any returned light propagating back to the source will ensure a better performance of the light source. In addition, since the intensity and phase relationship of the three interfered light waves being directed to the three detectors D1, D2, and D3 can be obtained beforehand, a proper electronic processing of the three interfered signals from detectors D1, D2 and D3 should produce the best SNR as can be offered for the case of Ai of FIG. 2.

It should be noted that while in all the illustrated embodiments, a fiber optics version of the present invention is illustrated; a bulk optics based free space version is also an alternative of the invention. It is also possible for the system to have some portion implemented using fiber optics and some other portions implemented using bulk optics. Micro-optical techniques, in which free-space optical devices such as plate beam-splitters are packaged in a small optical assembly, are becoming practical alternatives to purely fiber-based couplers. It should also be noted that the circulator is preferred to be polarization independent or insensitive but this is not absolutely required. If there is no need to monitor the source power, a 3-port circulator will be sufficient. If there is a need to monitor the source power, either a 4-port circulator can be used or a tap coupler can be inserted in the source arm or somewhere else in the interferometer. In addition, the above-mentioned splitting ratio of 50/50 is only preferred but not absolutely required, this is because an attenuator can be added to correct for non-exact 50/50 balancing of the detection and proper electronic processing can always be implemented to retrieve a best SNR as is well known to those skilled in the art. Furthermore, it should be understood that the key feature of the present invention is use of a circulator in a sample path that is looped back. As a result, the coupler can deliver most of the source power to the sample path for the forward propagating light from the source, while the returned sample light and the returned reference light is combined in a manner that will closely resemble a balanced detection scheme. Note that balanced detection means the use of more than one detector to provide a maximized SNR by taking into consideration the relative intensity as well as the relative phase relationship among the more than one interfered signals. Hence in addition to a monolithic 3×3 coupler or the alternative configuration of two cascaded 2×2 couplers, the same concept can be extended to a M×N coupler where M and N are integers greater than 2 and this should also include cascading a multiple number of couplers having port numbers less that the M×N coupler.

Embodiments 5 and 6

Figure 18A:
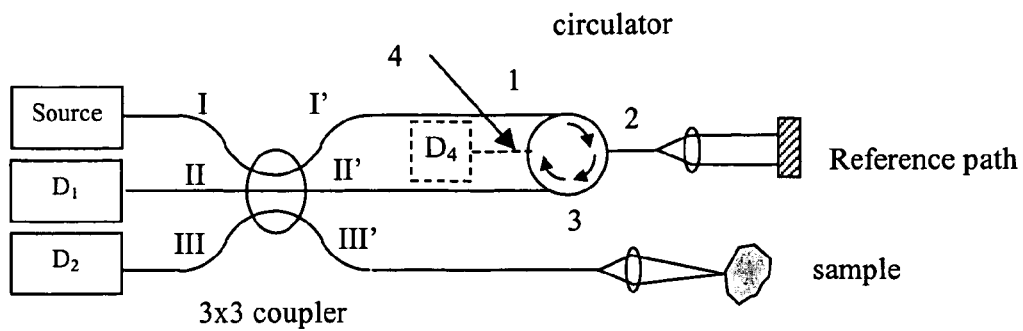
FIG. 18 illustrates a variation of the present invention in which the sample and reference paths are exchanged.
Figure 18B:
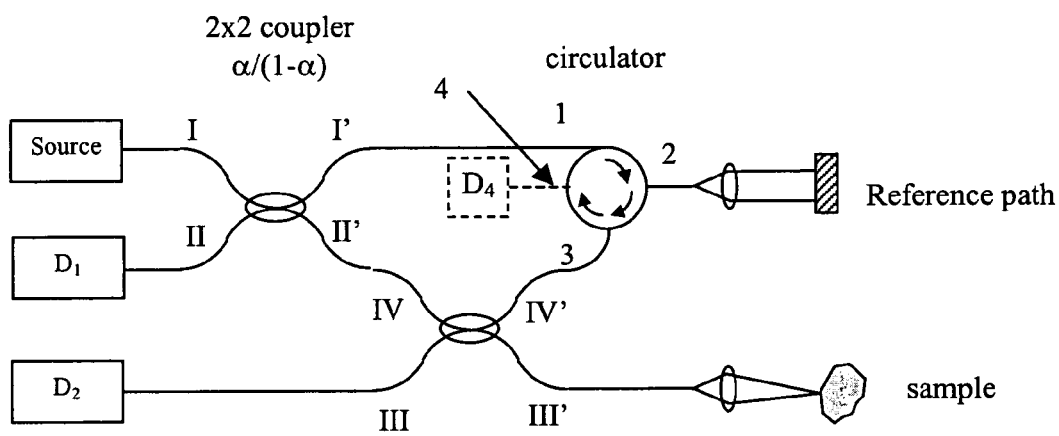
Figure 18C:
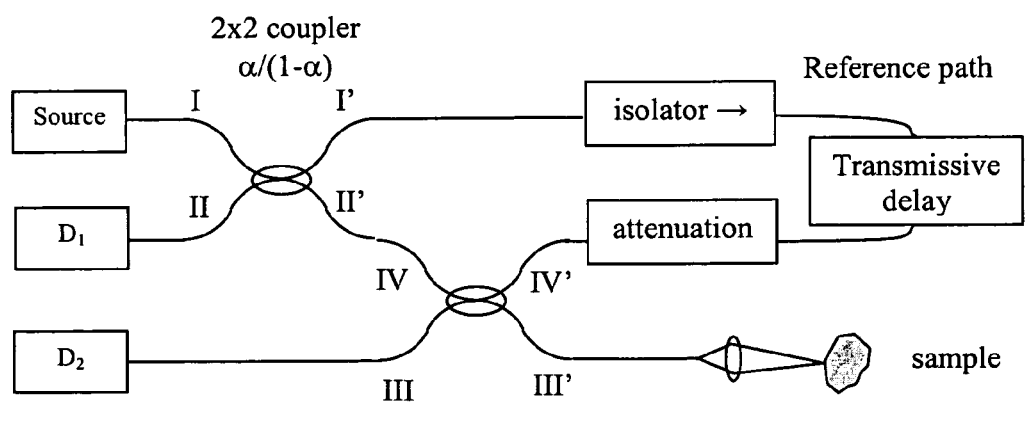

The interferometer structure of the present invention can be modified by exchanging the roles of sample and reference paths as shown in FIG. 18. The circulator, being a non-reciprocal element, prevents counter-propagating reference paths that would form Sagnac-loop interferometer, which is sensitive to rotation as is known from its use in optical gyroscopes. The non-reciprocal element could be a circulator as shown in FIGS. 18a and 18b an isolator as shown in FIG. 18c.

FIG. 18c further demonstrates the use of a variable transmissive delay in the reference path to adjust the optical path length difference between reference and sample path. Alternatively, the transmissive delay can be placed anywhere in the reference path or in the sample path. If the transmissive delay is placed in the reference path, then the transmissive delay can incorporate the reference path attenuation, for example by use of lossy reflectors or adapted fiber coupling efficiencies at transitions points from fiber to bulk optics.

Modifications analogous to those of FIGS. 3b and 3c can be made on the reference path. For example, the reference path can be made transmissive as shown in FIG. 18c. In FIG. 18c, the counter-propagating reference paths are allowed, so Sagnac-loop interference will affect the reference power reaching detector D1. However, the imbalance of the α/(1−α) coupler causes the clockwise-propagating reference signal to be stronger by the square of the ratio α/(1−α), so the amplitude of the interference effect on D1 can be reduced to a tolerable level.

In the embodiments of FIG. 18, the routing of light from source to sample and then from sample to detectors is not as efficient as in the preferred embodiment of FIG. 4. In cases where source optical power is not limited, however, the embodiments of FIG. 18 have the advantage of efficiently routing light reflected from the sample to the detectors.

Figure 7:
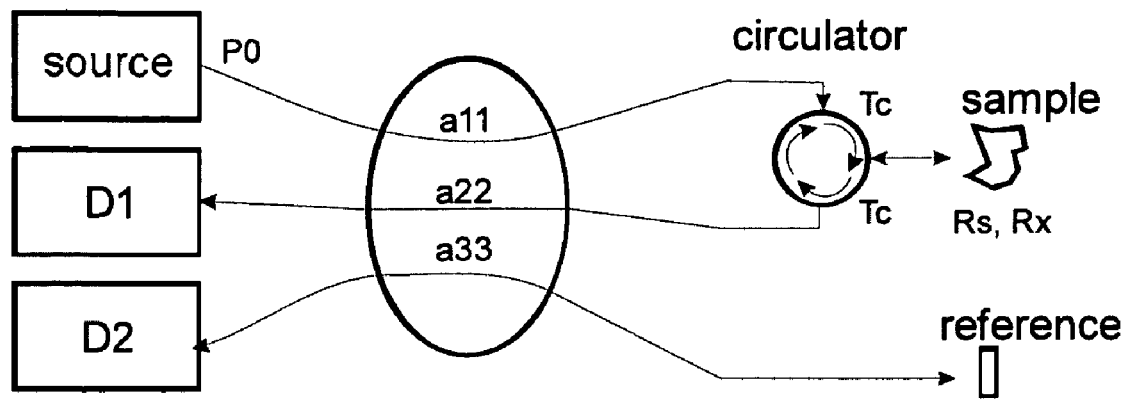
FIG. 7 is a schematic block diagram of the first embodiment of the present invention, further illustrating the coupling ratios.

Theoretical Analysis of SNR of the Present Design as Compared to Prior Art Designs Monolithic 3×3 Coupler Case In order to assess the performance of the present invention, a theoretical analysis on the signal to noise ratio of the present invention as compared to prior art design has been conducted. FIG. 7 shows the characterizing properties of the present design. Note that in the following, the parameter $a_{ij}$ stands for the optical power coupling ratio from the ith port on one side of a coupler to the jth port on the other side of the coupler where the coupler can be a 2×2 or 3×3 or a M×N coupler. The light source is characterized by its power P0, degree of polarization V, center wavelength λ and the spectral bandwidth Δλ (FWHM). The 3×3 coupler is characterized by the optical power throughput from source to sample arm ($a_{11}$), the throughput from sample to detector D1 ($a_{22}$) and the throughput from reference arm to detector D2 ($a_{33}$). In the following, it is assumed that there are no optical energy losses in the coupler and $a_{22}=a_{33}$ to support dual balanced detection. The circulator is characterized by its one-way transmission Tc. The sample arm is characterized by its reflectance Rs for coherent signal light and Rx, the reflectance for light incoherent with respect to light from the reference arm. The reflectance of the reference arm is Rr. The detectors are characterized by the receiver responsivity ρ, receiver noise γ and the bandwidth of the electronic detection system B.

If one assumes that there is no loss in the coupler and that the $a_{13}$, $a_{23}$, $a_{31}$, and $a_{21}$ cross coupling coefficients are all equal to each other for balanced detection, these coefficients can be calculated from the throughput-coefficients $a_{11}$ and $a_{22}=a_{33}$ as below:

$$a_{12} = a_{21} = a_{13} = a_{31} = \frac{1-a_{11}}{2} \quad (1)$$

$$a_{23} = a_{32} = \left(1 - a_{22} - \frac{1-a_{11}}{2}\right) \quad (2)$$

Note that $a_{11}$ and $a_{22}$ may only be chosen in accordance to energy conservation, i.e $a_{23} \geq 0$.

The optical powers at the detectors from sample (Ps, Px) and reference arm (Pr) are given by:

$PrD1 = P0 \cdot a_{13} \cdot Rr \cdot a_{32}$ $PrD2 = P0 \cdot a_{13} \cdot Rr \cdot a_{33}$ $PsD1 = P0 \cdot a_{11} \cdot Rs \cdot Tc^2 \cdot a_{22}$ $PsD2 = P0 \cdot a_{11} \cdot Rs \cdot Tc^2 \cdot a_{32}$ $PxD1 = P0 \cdot a_{11} \cdot Rx \cdot Tc^2 \cdot a_{22}$ $PxD2 = P0 \cdot a_{11} \cdot Rx \cdot Tc^2 \cdot a_{32} \quad (3)$ The detectors deliver the signals corresponding to the photo-currents $Iac1 = 2\rho\sqrt{PrD1 \cdot PsD1} \cdot \cos(k_0 \cdot \Delta l)$ $Iac2 = 2\rho\sqrt{PrD2 \cdot PsD2} \cdot \cos(k_0 \cdot \Delta l + \Delta\phi) \quad (4)$ which are ac-signals in case of a fast modulation of the reference arm length Δl, while $k_0$ is the center wave-number, ρ is the receiver responsivity and Δφ is the phase shift introduced by the 3×3 coupler. Because it is assumed that the cross-coupling $a_{12}=a_{13}$ is weak compared to the throughput coefficients $a_{11}$ and $a_{22}=a_{33}$, we assume that the interfering waves behave in a similar way as in the case of an ordinary 2×2 coupler, i.e. we assume that the phase shift is close to $$\Delta\phi \approx \pi, \qquad (5)$$

which is a requirement for taking full advantage of the balanced detection scheme using subtraction of photo-currents. Generally, the phase-shifts introduced by a 3×3 coupler depend on the coupling coefficients [M. A. Choma, et al. (2003). "Instantaneous quadrature low-coherence interferometry with 3×3 fiber-optic couplers." *Optics Letters* 28(22): 2162]. For example, a symmetric 33/33/33-beam-splitter causes 120 degree phase shifts between the output channels.

If the actual phase-shift is different from (5) an appropriate electronic phase-shifting of the photo-current could be utilized before addition or a separate signal registration and suitable subsequent numerical addition [M. A. Choma, et al. (2003). "Instantaneous quadrature low-coherence interferometry with 3×3 fiber-optic couplers." *Optics Letters* 28(22): 2162] could be utilized.

Without loss of generality, we therefore assume the validity of (5) and the balanced detection delivers an ac-photo current $$Is = Iac1 - Iac2 \qquad (6)$$

which corresponds to a mean-square signal $$<Is^2> = 8\rho \cdot PrD1 \cdot PsD1 = 8\rho \cdot PrD2 \cdot PsD2. \qquad (7)$$

Due to the fact that the amount of coherent light back-scattered from the sample is small compared to that received from the reference arm and even the incoherent light from the sample arm (spurious back-reflexes), the average photo-currents are given by $$Idc1 \approx \rho(PrD1 + PxD1)$$

$$Idc2 \approx \rho(PrD2 + PxD2). \qquad (8)$$

The signal-to noise-ratio (SNR) is given by $$SNR = 10\log_{10}\left(\frac{<Is^2>}{\sigma_\Sigma^2}\right), \qquad (9)$$

where the composition of the noise variance $\sigma_\Sigma^2$ of the balanced detection is analyzed as below.

Important contributions to the total noise are the shot noise, the receiver noise and excess noise, where the latter can degrade to so-called beat noise in case of balanced detection. Therefore the total noise variance is $$\sigma_\Sigma^2 = \sigma_{Shot\Sigma}^2 + \sigma_{Beat\Sigma}^2 + \sigma_{Receiver\Sigma}^2 \qquad (10)$$

The shot noise variance of the two detector arrangement is the sum of the shot noise variance of the two single detectors $$\sigma_{Shot\Sigma}^2 = 2qB(Idc1+Idc2), \qquad (11)$$

where q is the charge of an electron and B is the electronic circuit bandwidth (resolution time of circuit T=½ B), [B. E. A Saleh and M. C. Teich, "Fundamentals of Photonics", John Wiley and Sons, Inc. 1991]

The variance of the excess of one single detector, for example D1 is $$\sigma_{ExcessD1}^2 = (1+V^2)Idc1^2 \frac{B}{\Delta\upsilon}, \qquad (12)$$

where $$\Delta\upsilon = \sqrt{\frac{\pi}{2\ln 2}} \cdot \frac{c\Delta\lambda}{\lambda^2}$$

is the effective linewidth of the source [A. M. Rollins and J. A. Izatt "Optimal interferometer designs for optical coherence tomography" Optics Letters, Vol. 24 Issue 21 Page 1484 (1999)].

The variance of the receiver noise of the two detector combination is given by $$\sigma_{Receiver\Sigma}^2 = 2 \cdot \gamma^2 B. \qquad (13)$$

If the signals of the two detectors add incoherently, i.e. the phase of the photocurrents is not used, the excess noise variance is the sum of the excess noise variances of the single detectors $$\sigma_{Excess\Sigma}^2 = (1+V^2)(Idc1^2 + Idc2^2)\frac{B}{\Delta\upsilon}, \qquad (13)$$

where V is the degree of polarization of the light source. But balanced detection is able to suppress the excess noise effectively by subtraction of the 180 degree phase shifted photocurrents. The limit of this suppression is the so-called beat noise, which results from interference terms which do not mutually cancel in the balanced detection scheme [K. Takada, "Noise in optical low-coherence reflectometry" IEEE J. Quant. Electron, Vol. 34 Issue 7 Page1098 (1998), A. M. Rollins and J. A. Izatt "Optimal interferometer designs for optical coherence tomography" Optics Letters, Vol. 24 Issue 21 Page 1484 (1999)]. Assuming well balanced detection with $PrD1=PrD2=\overline{Pr}$ and $PxD1=\overline{Px}$ (which can be adjusted by means of an attenuator):

$$\sigma_{Beat\Sigma}^2 = 2(1+V^2)\rho^2 \cdot \overline{Pr} \cdot \overline{Px} \cdot \frac{B}{\Delta\upsilon}. \qquad (14)$$

Note, in some "secondary" literature [A. M. Rollins and J. A. Izatt "Optimal interferometer designs for optical coherence tomography" Optics Letters, Vol. 24 Issue 21 Page 1484 (1999)] an extra factor of 2 is used in the definition of the beat noise, while the expression shown here is consistent with the "primary" literature [K. Takada, "Noise in optical low-coherence reflectometry" IEEE J. Quant. Electron, Vol. 34 Issue 7 Page1098 (1998)]. However, the impact of this factor is marginal because only shot noise dominates the total SNR outcome after the excess noise is efficiently suppressed.

While choosing $\overline{Pr}=Max(PrD1, PrD2)$ and $\overline{Px}=Max(PxD1, PxD2)$ allows a worst case estimation, we choose $\overline{Pr}$ and $\overline{Px}$ to be the averaged values, which supports numerical optimization of coupler coefficients better.

Figure 8:
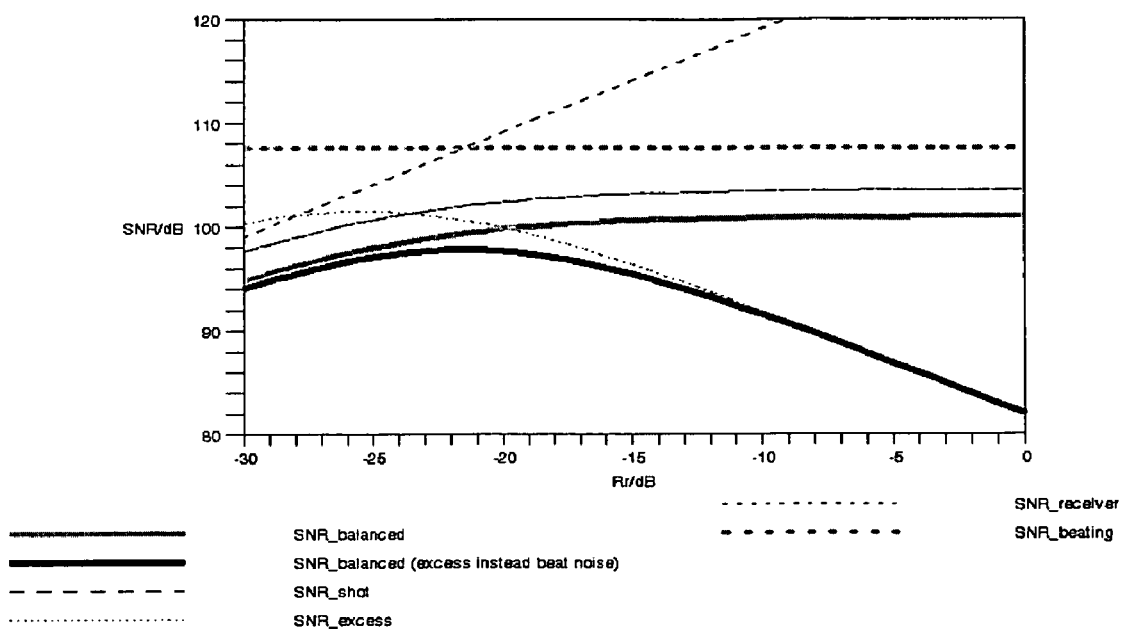
FIG. 8 is a plot of the expected signal-to-noise ratio (SNR) achieved by using the first embodiment of the present invention.

Assuming $a_{11}$=0.8 and $a_{22}$=0.4 and the following parameters, we obtain the dependences of the SNR and its components on the reference arm reflectance Rr shown in FIG. 8.

| | |
|---|---|
| Source power | P0 = 10 mW |
| Degree of polarization | V = 0 |
| Circulator transmission (one-way) | Tc = 0.85 (one way loss 0.7 dB) |
| Spectral width of source and center wavelength | Δλ = 35 nm @ 1310 nm |
| receiver responsivity | ρ = 0.9 A/W |
| receiver Noise | γ = 0.6 pA/√Hz |
| electronic circuit bandwidth | B = 1.275 MHz |
| Reference arm reflectance (if not varied) | Rr = 0.0316 (attenuation 15 dB) |
| Sample Arm reflectance, components coherent to reference arm | Rs = 1 (without loss of generality, because scales signal only) |
| Sample Arm reflectance, components incoherent to reference arm | Rx = 5 × 10$^{-4}$ |

Obviously, Rr should be made as large as possible to obtain maximum SNR if the excess noise is suppressed by balanced detection, but in reality, the choice of Rr is not critical as far as it is in the range of 0 to 15 dB attenuation.

Figure 9:
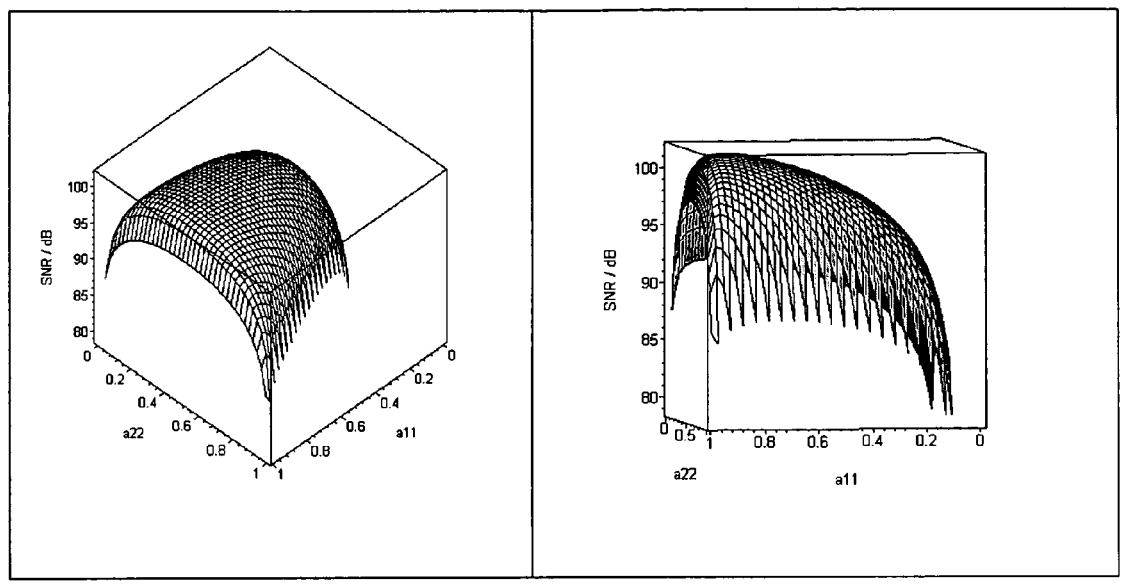
FIG. 9 further illustrates the expected signal-to-noise ratio (SNR) achieved by using the first embodiment of the present invention.

After choosing an Rr attenuation in accordance to FIG. 8, one can determine the optimal $a_{11}$ and $a_{22}$ coefficients to achieve the maximum SNR (FIG. 9). For the an Rr=−15 dB this yields an maximum SNR=101.7 for $a_{11}$=0.87 and $a_{22}$=0.47 respectively.

This corresponds to an improvement of 15.5 dB compared to standard Michelson configuration and about 1 dB improvement compared to the Ci configuration (Michelson with circulator in source arm and balanced detection), mentioned above. The huge improvement compared to the standard Michelson results mainly from the fact, that Rr is not optimized for this configuration which causes a loss of SNR of more than 8 dB.

Two Cascaded 2×2 Coupler Case

Figure 10:
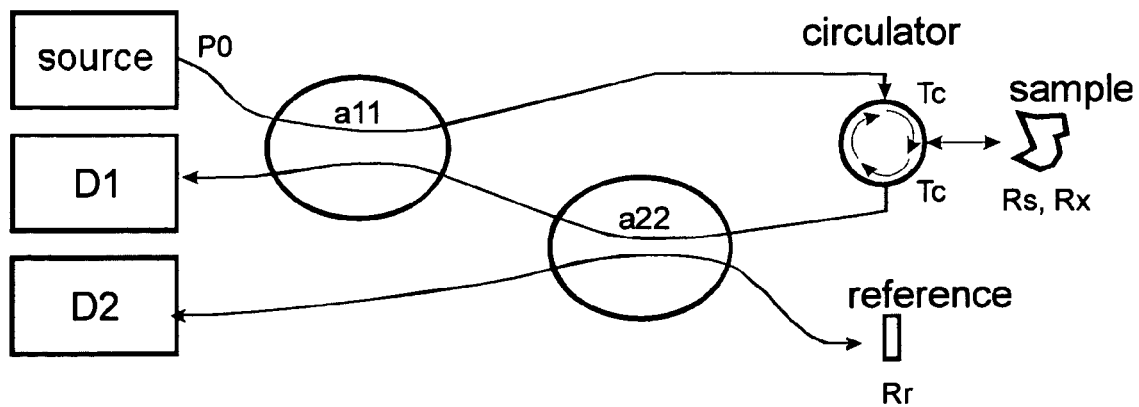
FIG. 10 is a schematic block diagram of the second embodiment of the present invention, further illustrating the coupling ratios.

As mentioned before, the invention can also be mimicked by a configuration employing two cascaded 2×2 couplers as shown in FIG. 10. This configuration has the disadvantage that one more coupler is required, but has the advantage that a more close to ideal balanced detection can be achieved. In this design, the 3×3-coupler is basically split into two 2×2 couplers, where the first coupler has a high optical power transmission from the source to the sample arm (transmission $a_{11}$) and the second coupler (transmission $a_{22}$, cross-coupling $a_{23}$=1−$a_{22}$) provides the nearly balanced superposition of sample and reference arm light. This definition of the coefficients is a direct translation of the coefficient definition in the monolithic 3×3 coupler case to allow direct comparison of the results.

If no losses in the couplers are assumed, i.e. the cross-coupling coefficients are given by $$a_{12} = 1 - a_{11} \quad (14)$$

$$a_{23} = 1 - a_{22}. \quad (15)$$

The calculation of the theoretical SNR can be performed in the same way as for the monolithic 3×3 coupler configuration, except that the optical powers at the detectors from the sample (Ps, Px) and reference arm (Pr) have to be adapted properly:

$$PrD1 = P0 \cdot a_{12} \cdot a_{23} \cdot Rr \cdot a_{23} \cdot a_{11}$$

$$PrD2 = P0 \cdot a_{12} \cdot a_{23} \cdot Rr \cdot a_{22}$$

$$PsD1 = P0 \cdot a_{11} \cdot Rs \cdot Tc^2 \cdot a_{22} \cdot a_{11}$$

$$PsD2 = P0 \cdot a_{11} \cdot Rs \cdot Tc^2 \cdot a_{23}$$

$$PxD1 = P0 \cdot a_{11} \cdot Rx \cdot Tc^2 \cdot a_{22} \cdot a_{11}$$

$$PxD2 = P0 \cdot a_{11} \cdot Rs \cdot Tc^2 \cdot a_{23} \quad (16)$$

Figure 11:
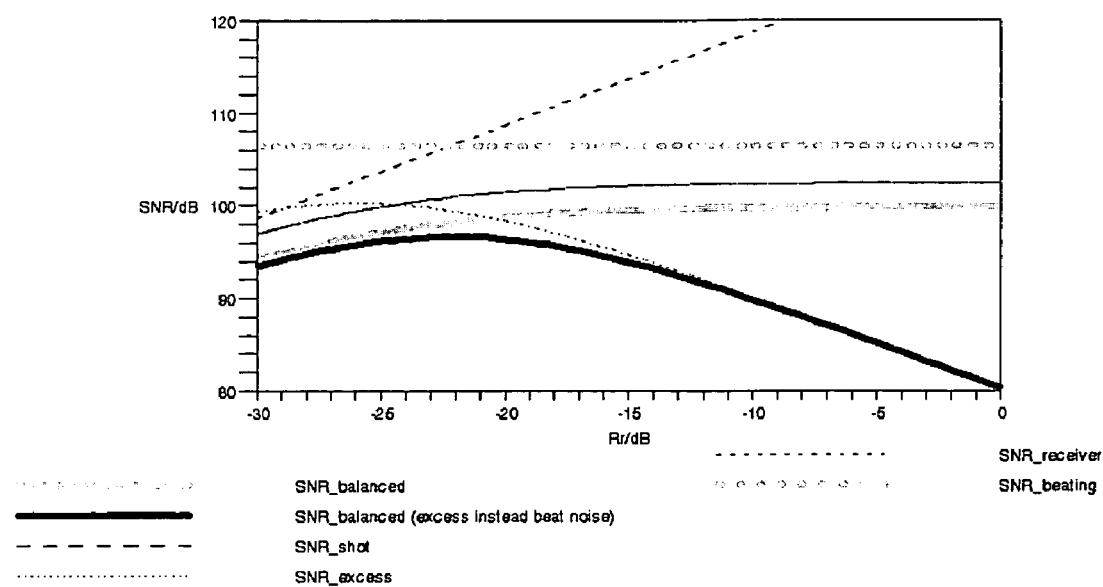
FIG. 11 is a plot of the expected signal-to-noise ratio (SNR) achieved by using the first embodiment of the present invention.

Using the above equations and the same parameters as for the calculation of the curves in FIG. 8, we obtain the dependence of the SNR and its constituents on the Rr reflectance shown in FIG. 11.

For the case of Rr=−15 dB, the optimization of coupling ratios yields an maximum SNR=101.2 dB with $a_{11}$=0.91 and $a_{22}$=0.45 respectively. This performance and the optimal parameters are obviously very similar to that of the monolithic 3×3 coupler configuration.

SUMMARY

The SNR in dB and the SNR gain in dB under different conditions are calculated and listed in summary form as below. Note that for cases of Ai, Bi and Ci, the formula for calculating the SNR are based on the paper by A. M. Rollins and J. A. Izatt ["Optimal interferometer designs for optical coherence tomography" Optics Letters, Vol. 24 Issue 21 Page 1484 (1999)]

Figure 1:
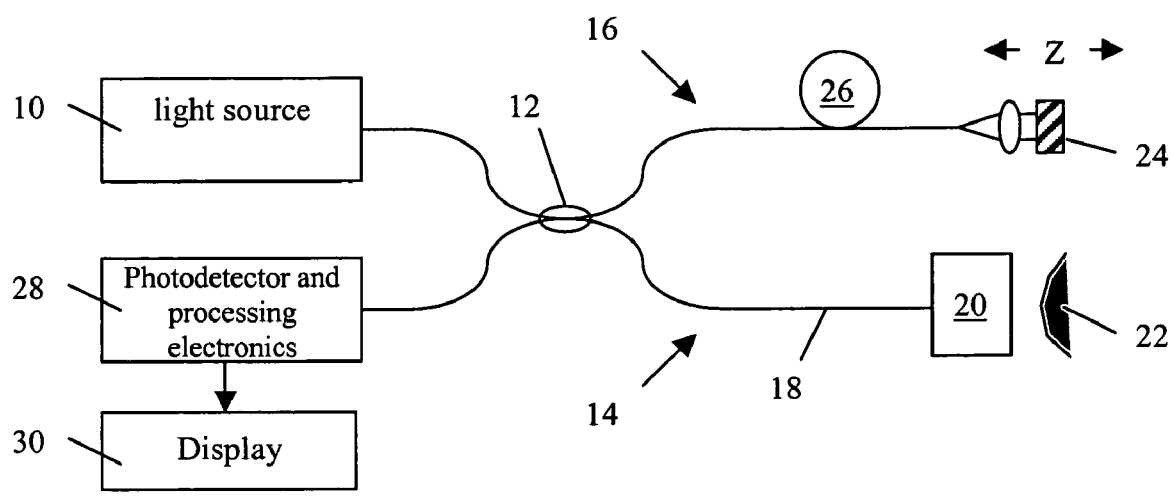
FIG. 1 is a schematic block diagram of an OCT system using a classical Michelson interferometer, as is known in the art.

| Interferometer Type | Rx = 5 × 10$^{-4}$ assumed optimized Rr | Rx = 5 × 10$^{-5}$ assumed optimized Rr |
|---|---|---|
| Standard Michelson of FIG. 1 | 94.7 dB with Rr = 0.001, α = 0.5 | 96.6 dB with Rr = 0.001, α = 0.5 |
| Ci-Type of FIG. 2 (Michelson with circulator) | 101.0 dB, (6.3 dB) with Rr = 1, α = 0.5 | 101.9 dB, (5.3 dB) with Rr = 1, α = 0.5 |
| Ai-Type and Bi-type of FIG. 2 (Mach-Zehnder) | 104.8 dB (10.1 dB) with Rr = 1, α = 0.015 | 104.9 dB (8.3 dB) with Rr = 1, α = 0.018 |
| Two cascaded 2 × 2 coupler version of FIG. 4 or FIG. 10 | 102.7 dB (8.0 dB) with Rr = 1, α$_{11}$ = 0.98, α$_{22}$ = 0.49 | 104.4 dB 7.8 dB) with Rr = 1, α$_{11}$ = 0.99, α$_{22}$ = 0.49 |
| 3 × 3 monolithic coupler version of FIG. 3 or FIG. 7 | 102.9 dB (8.2 dB) with Rr = 1, α$_{11}$ = 0.97, α$_{22}$ = 0.49 | 104.6 dB (8.0 dB) with Rr = 1, α$_{11}$ = 0.98, α$_{22}$ = 0.50 |

Standard Michelson:

A standard Michelson configuration for the given set of parameters requires a relatively large reference arm attenuation (Rr=1E−3) to work well, because otherwise the excess noise would significantly lower the SNR. If this is the case, the other interferometer configuration show huge relative improvements when compared to the standard Michelson configuration.

Ci-Type:

In the pure shot noise limit case, the Ci-type interferometer is able to improve the SNR only by +3 dB compared to the standard Michelson configuration, because it utilizes nearly twice as much light as in the standard Michelson case by employment of two detectors. Further the SNR improvement also results from efficient excess noise suppression due to the balanced detection scheme, leading to a total SNR improvement of +5.6 dB.

Ai-Type and Bi-Type:

In the pure shot noise limit regime, the Ai-type and Bi-type interferometer configurations should be able to improve the SNR by +3 dB when compared to the Ci-type (a=0.5) and +6 dB when compared to the standard Michelson case, because it can direct twice the amount of light into the sample arm and utilizes whatever comes back. Considering the other types of noise, the total SNR improvement is +8 to 10 dB compared to the standard Michelson interferometer. Note that Bi is virtually identical to Ai with the only difference that there is a small amount of light being sent back to the source arm in the Bi case and hence the performance of Bi is only slightly worse than that of Ai.

Present invention:

The presently invented monolithic 3×3 coupler configuration and its two cascaded 2×2 coupler configuration implementation are expected to achieve an improvement better than the Ci-configuration (because it directs more light into the sample arm, while still being quite well balanced) and only slightly worse than the Ai-configuration, because a small amount of light is sent back to the source as in the Bi case and eventually a minor attenuation has to be employed for the two cascaded 2×2 coupler case to achieve good balanced detection. Therefore the total SNR improvement ranges from +7 to 8 dB compared to the standard Michelson.

Reduction to Practice

A configuration as illustrated in FIG. 4 of embodiment 2 was constructed, tested and analyzed. The configuration consisted of a compound of nominal 90/10 (actual '87/13) and nominal 50/50 couplers. A 3-port circulator was spliced into the sample arm. A comparison is made with the configuration of Ci of FIG. 2. For the configuration of FIG. 4 of the present invention, the optical power incident on the sample was measured to be 9.6 mW and approximately 5 µW reached the two detectors. For the configuration of Ci of FIG. 2, the optical power incident on the sample was measured to be 4.6 mW and approximately 25 µW returned from the reference optical delay line to each of the two photodiodes. An attempt was made to optimize the polarization in the reference arm before each longitudinal depth scan.

It should be noted that only one human eye has been measured with both configurations, and only a few images were recorded. The images chosen for analysis here represent the best of their type from among the small set of images available. Nevertheless, the anterior chamber eye section images, together with easily interpreted test eye data, provided strong initial evidence that SNR performance with the embodiment 2 of FIG. 4 of the present invention is better than the performance of the configuration of Ci of FIG. 2.

Figure 12:
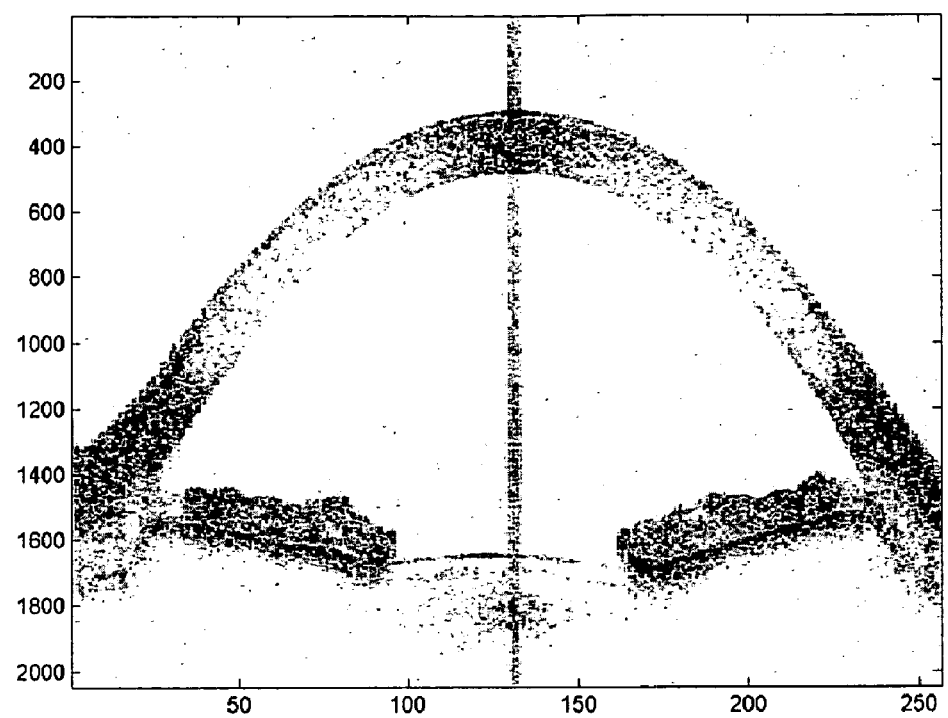
FIG. 12 is an example of the OCT images obtained using the systems illustrated in FIG. 2 and FIG. 4.
Figure 12:
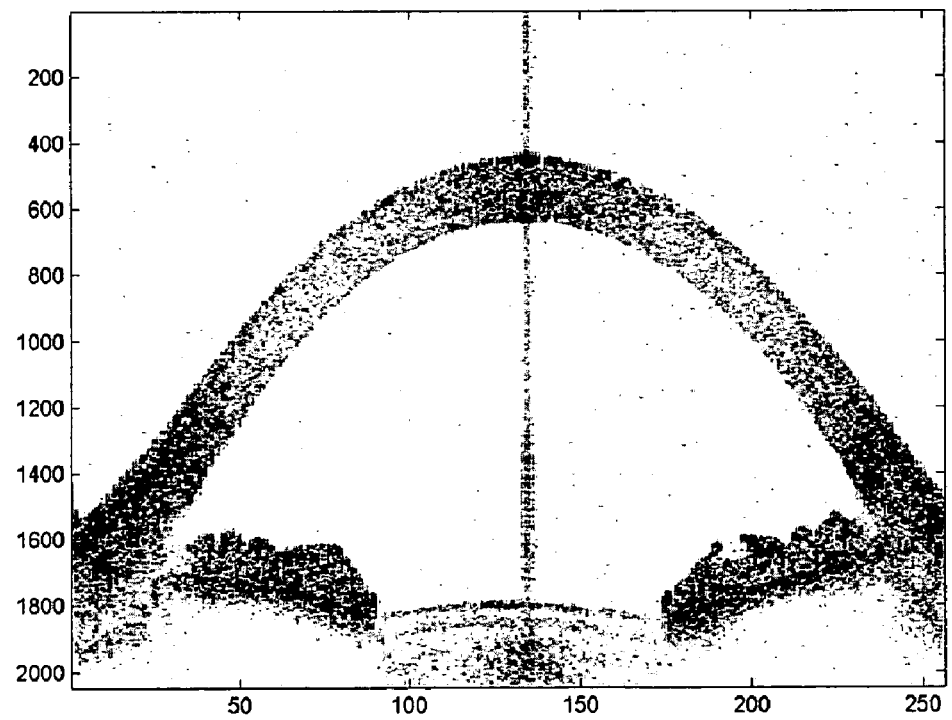

Comparative horizontal line scan images of an anterior chamber are displayed in FIG. 12 in which (a) and (b) show respectively the images obtained with the Ci of FIG. 2 and the FIG. 4 configurations. The pixel values have been scaled logarithmically, and a reverse gray scale "colormap" has been used to allow accurate reproductions on white paper with black toner. The images are of the same human subject, and the gray scale has been normalized in each case with respect to the background noise level (the mean of pixel values found in a free space region of the image). Thus, all pixels of the same color in both images represent the same SNR. There are several things to notice in FIG. 12. First, the SNR is stronger throughout the corneal tissue in the FIG. 4 configuration image. Second, the anterior surface layer and the bulk of the crystalline lens are easier to discern. Third, the spot associated with corneal reflex is larger and more intense in the FIG. 4 configuration image. This is because the sensitivity of the instrument to specular reflections from surfaces is now enhanced. To achieve the best contrast at surfaces that are nearly normal to the beam, it may be necessary in the FIG. 4 configuration case to slightly misalign the subject's eye from the reflex alignment. It was possible to resolve the posterior surface of the crystalline lens with contrast comparable to the anterior surface.

Figure 13:
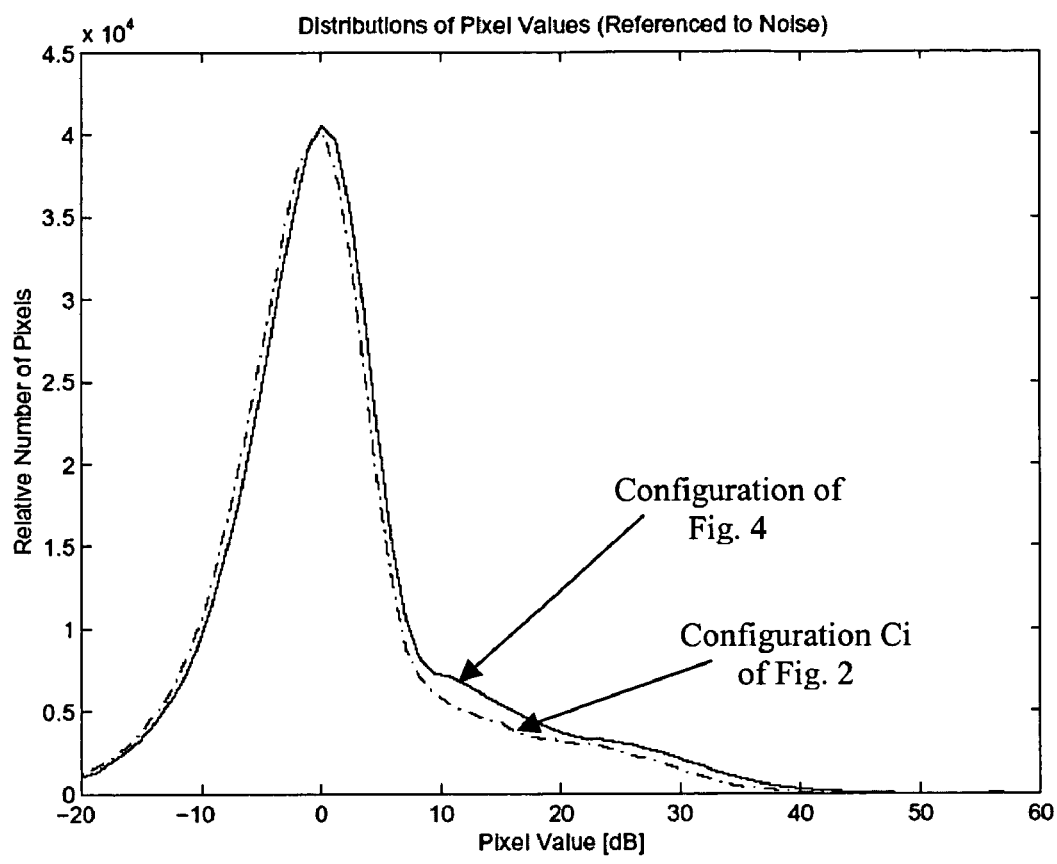
FIG. 13 is a histogram of the pixel intensities of the images in FIG. 12, demonstrating the improved SNR of the present invention.

One way to analyze the aggregate SNR of an image is to plot a histogram of the pixel values in the image. Roughly speaking, there will a peak in the histogram corresponding to the distribution of noise, and there will be additional peaks corresponding to each type of tissue in the image. The separation between the noise peak and a particular tissue peak indicates the SNR for that type of tissue. The histograms for the two images in FIG. 12 are compared in FIG. 13. The data has been scaled so that the noise peak is centered at 0 dB in each case. The distributions are multimodal because there are several kinds of tissue in the anterior chamber sections. The comparison is somewhat complicated because it is difficult to resolve individual Ci configuration data.

Figure 14:
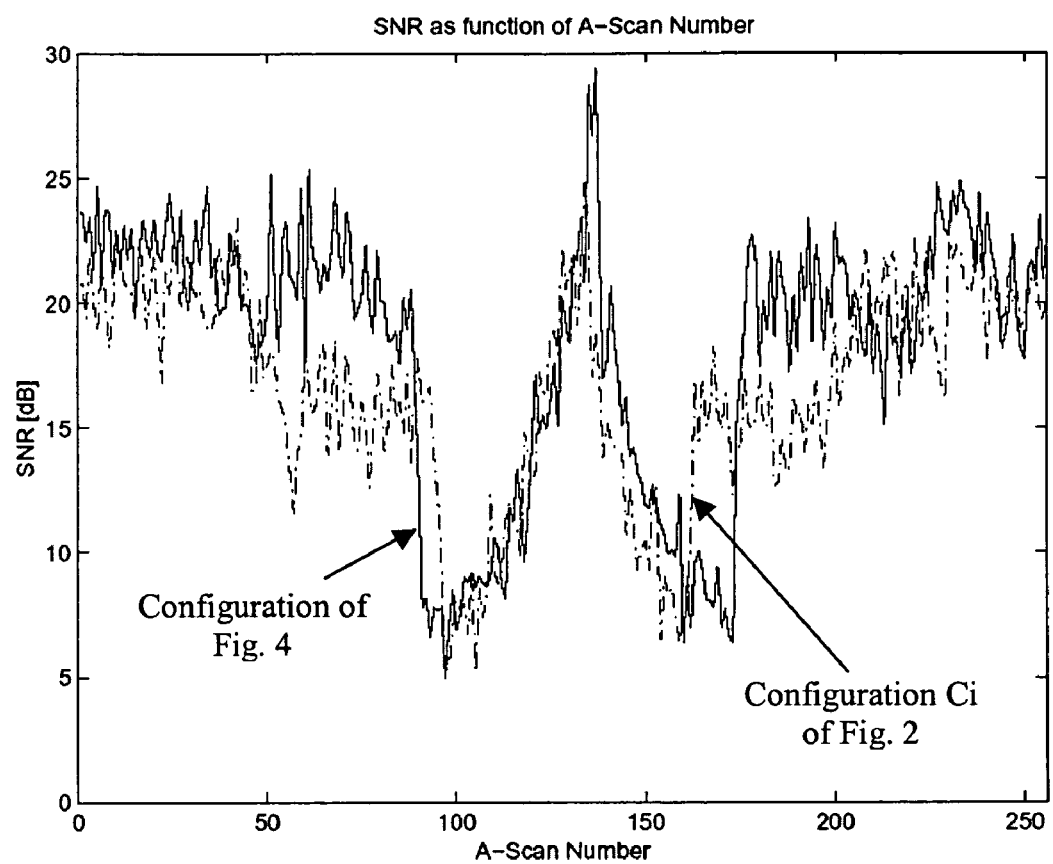
FIG. 14 plots the integrated pixel intensities from the images in FIG. 12, demonstrating the improved SNR of the present invention.

A second way to compare SNR is to use a well-defined procedure to compute the SNR for the individual A-scans that comprise the images. A Matlab script was used to identify the background noise level, find "signal pixels" with values above the noise, and also exclude the extremely high-valued pixels found at retro-reflecting surfaces. The average of the signal pixels, mostly from tissue bulk, was divided by the noise level to find the SNR for a single A-scan. The SNR varies across a line scan because of the different proportions and orientations of the tissue types involved. FIG. 14 shows the SNR of individual A-scans computed across the line scans of FIG. 12. On average, the presently invented FIG. 4 configuration A-scans yield an SNR that is 2-3 dB better than those of the Ci configuration of FIG. 2. The peak in SNR at the center of the plot corresponds to the peak in corneal reflectivity at near-normal incidence. There are also abrupt steps in SNR at the edges.

Figure 15:
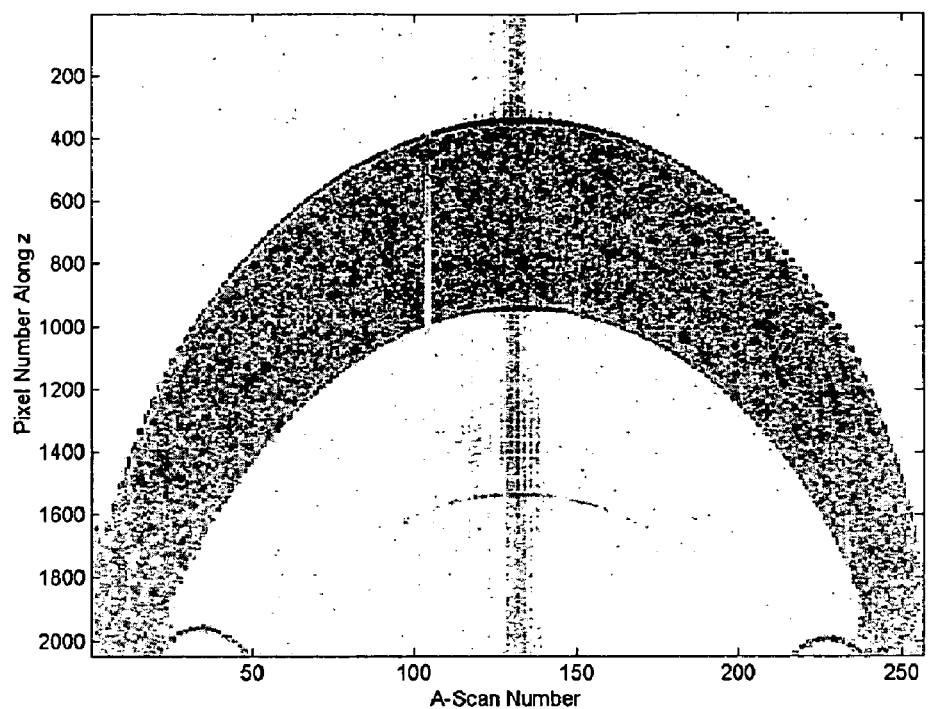
FIG. 15 is a further example of the OCT images obtained using the systems illustrated in FIG. 2 and FIG. 4.
Figure 15:
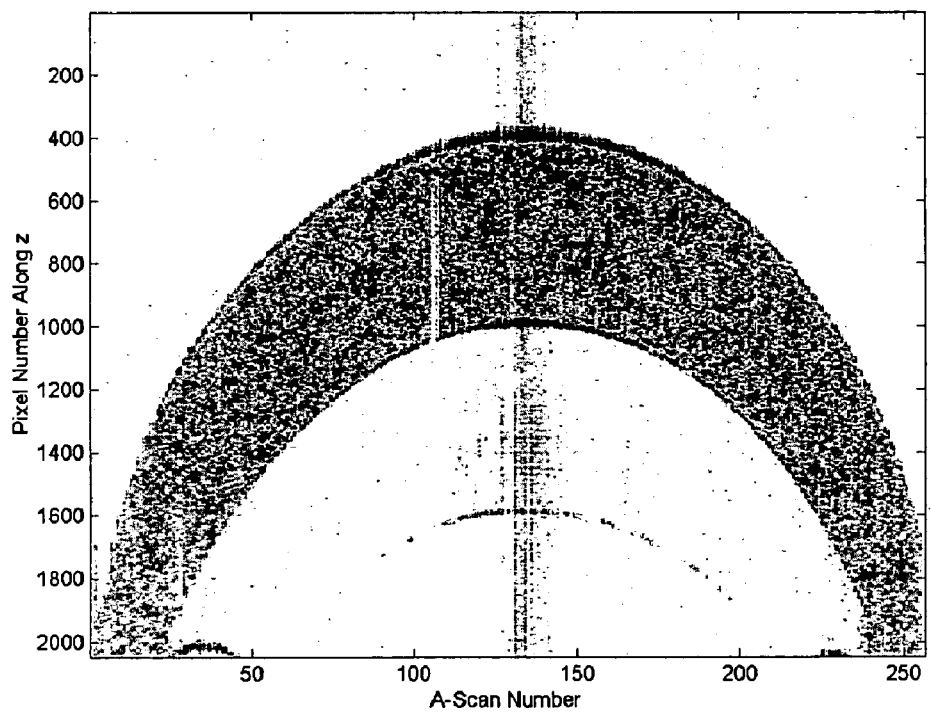
Figure 16:
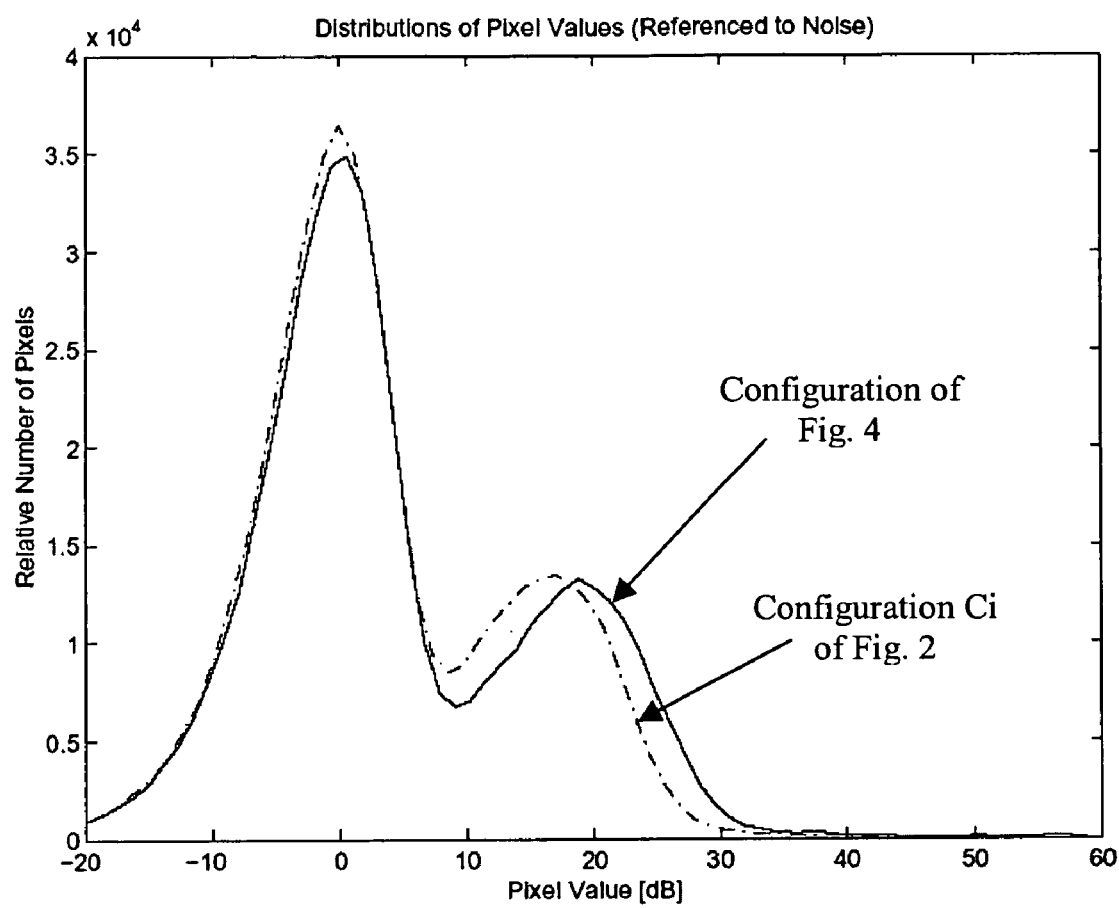
FIG. 16 is a histogram of the pixel intensities of the images in FIG. 15, demonstrating the improved SNR of the present invention.

Although data from human subjects provide the most important test of OCT system performance, data taken with a test eye are more easily interpreted and compared. This is because the alignment, geometry, and composition of the test eye is guaranteed to be consistent from scan to scan. FIG. 15 shows horizontal line scan images of a test eye consisting of a vertical plastic tube, in which (a) is the image obtained with the configuration of Ci of FIG. 2 and (b) is the image obtained with the presently invented configuration of FIG. 4. The backscattering from the plastic bulk is roughly comparable to the backscattering from corneal tissue. As with the cornea, the sensitivity to retro-reflection from surfaces is significantly greater with the presently invented configuration of FIG. 4. Since the plastic is a homogeneous "tissue," the histogram of pixel values for this test eye is a distinctive bimodal distribution. As shown in FIG. 16, the signal from backscattering inside the plastic has a peak that is clearly separated from the noise peak. In the image taken with the presently invented configuration of FIG. 4, the center of the signal peak is at a pixel value that is 2 dB larger than in the image of configuration Ci of FIG. 2. This indicates that the average SNR for the plastic is about 2 dB better with the present invention image.

Figure 17:
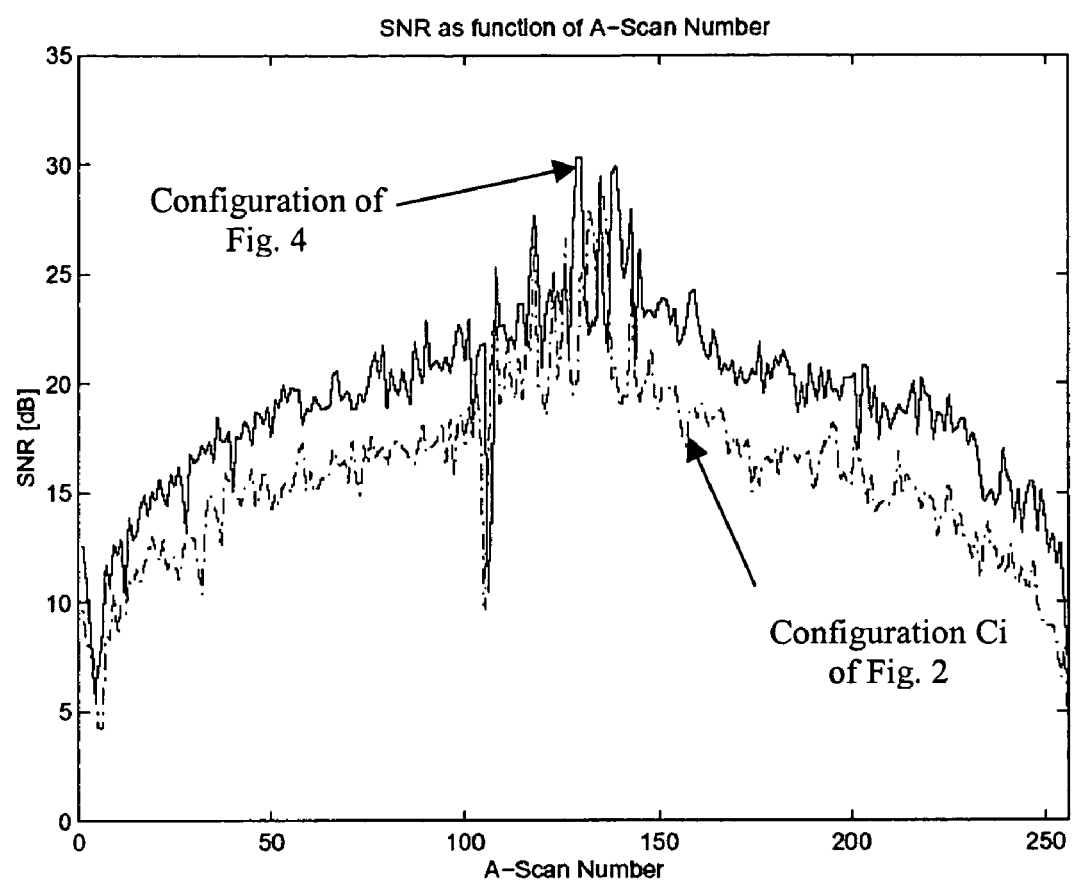
FIG. 17 plots the integrated pixel intensities from the images in FIG. 12, demonstrating the improved SNR of the present invention.

Similar to the anterior chamber section results, FIG. 17 shows that the SNRs calculated for each A-scan across the test eye are also 2-3 dB better with the presently invented interferometer configuration.

It should be pointed out that the data shown here for the presently invented interferometer configuration of FIG. 4 do not necessarily represent the best possible performance of the new design. The prototype set-up was hand-assembled and consists of a compound of two 2×2 fiber-optic couplers.

Experimentally, neither the coupling ratios nor the attenuation of the reference arm have been optimized. It is likely that some further increase in SNR can be attained.

Applications

It should be highlighted that the configurations of the present invention are relatively simple and compact when compared to prior art configurations. In addition to general optical interferometry for various applications, such as distance measurement, topography and three dimensional measurement of a volume sample, the present invention is particularly beneficial for application in various optical coherence tomography schemes, including time domain OCT, spectral domain OCT and swept source OCT. In the latter two cases, the optical delay line does not need to be scanned. Alternatively, the optical delay line may be used to achieve phase tracking or a $\pi$ phase shift dithering of the optical path length and hence to realize differential spectral interferometry.

The foregoing description of the invention is presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated.

REFERENCES

The following Patents, patent applications and articles are incorporated herein by reference.

U.S. Patent Publications
  U.S. Pat. No. 5,321,501
  U.S. Pat. No. 5,459,570
  U.S. Pat. No. 5,491,524
  U.S. Pat. No. 5,956,355
  U.S. Pat. No. 6,134,003
  U.S. Pat. No. 6,175,669
  U.S. Pat. No. 6,282,011
  U.S. Pat. No. 6,384,915
  U.S. Pat. No. 6,657,727
  U.S. Pat. No. 6,198,540
  US patent Application No.: 2005/0213103
  US patent Application No.: 2004/0239938
  US patent Application No.:2004/0239943

Foreign Patent Applications
  EP1253398
  DE 4403929A1;

Non-patent Literature

B. E. Bouma and G. J. Tearney (1999). "Power-efficient nonreciprocal interferometer and linear-scanning fiber-optic catheter for optical coherence tomography." *Optics Letters* 24(8): 531-533.

Fujimoto, J. G. "Optical coherence tomography for ultra-high resolution in vivo imaging." *Nat Biotechnol* 21(11): 1361-7, (2003)).

Fujimoto, J. G. et al. "Optical Coherence Tomography: An Emerging Technology for Biomedical Imaging and Optical Biopsy" *Neoplasia* (2000) 2, 9-25;

Huang, D., E. A. Swanson, et al. (1991). "Optical coherence tomography." *Science* 254 (5035): 1178-81;

K. Takada, "Noise in optical low-coherence reflectometry" IEEE J. Quant. Electron, Vol. 34 Issue 7 Page 1098 (1998).

M. A. Choma, et al. (2003). "Instantaneous quadrature low-coherence interferometry with 3×3 fiber-optic couplers." *Optics Letters* 28(22): 2162;

M. Rollins and J. A. Izatt "Optimal interferometer designs for optical coherence tomography" Optics Letters, Vol. 24 Issue 21 Page 1484 (1999)].

M. C. Tomic, et al. "Low-coherence interferometric method for measurement of displacement based on a 3 ×3 fibre-optic directional coupler" J. Opt. A: Pure Appl. Opt. 4 (2002) S381-S386;

M. V. Sarunic, et al. "Instantaneous complex spectral domain OCT using 3×3 fiber couplers" SPIE Vol. 5316, p 241-247

Rollins A. M. et al. "Emerging Clinical Applications of Optical Coherence Tomography" Optics and Photonics News, Volume 13, Issue 4, 36-41, April 2002;

Schmitt, J. M. "Optical coherence tomography (OCT): a review" IEEE Journal of Selected Topics in Quantum Electronics, Volume: 5, Issue: 4, Year: July/August 1999 pages: 1205-1215;

Sorin, W. V. et al. (1992) "A simple intensity noise reduction technique for optical low-coherence reflectometry." *Photonics Technology Letters, IEEE* 4(12): 1404-1406

Swanson E. A. et al. "Optical coherence tomography, Principles, instrumentation, and biological applications" Biomedical Optical Instrumentation and Laser-Assisted Biotechnology, A. M. Verga Scheggi et al. (eds.) pages: 291-303, 1996 Kluwer Academic Publishers, Printed in the Netherlands;

Youngquist et al., "Optical Coherence-Domain Reflectometry: A New Optical Evaluation Technique", 1987, Optics Letters 12(3):158-160

Yazdanfar, S. and J. A. Izatt "Self-referenced Doppler optical coherence tomography." *Optics Letters* 27(23): 2085-2087

We claim:

1. An interferometer for use in an optical coherence tomography (OCT) system comprising:
  a light source;
  a first 2×2 coupler having four ports;
  a second 2×2 coupler having four ports, with light from the source being coupled to a first port of the first coupler, with the first coupler dividing the light between a sample path and a first portion of a reference path, with the light exiting the first coupler into the sample path from a second port and, after scattering from the sample, returning to a second port of the second coupler and with the light exiting the first coupler into the first portion of the reference path from a third port and entering the second coupler via a first port, with the light exiting the second coupler into a second portion of the reference path from a third port and returning to the second coupler via said third port;
  a first detector for receiving light returned from both the sample and the reference paths via a path through the first port of the second coupler and a fourth port of the first coupler and generating first output signals in response thereto; and
  a second detector for receiving light returned from both the sample and the reference paths via a fourth port of the second coupler and generating second output signals in response thereto, said first and second output signals containing information about the light scattering properties of the sample.

2. An interferometer as recited in claim 1, further comprising a circulator as part of the sample path and functioning to direct the light received from the second port of the first coupler to the sample and direct a portion of the light collected upon scattering from the sample to the second port of the second coupler.

3. An interferometer as recited in claim 2, wherein the circulator further directs light to a third detector for monitoring the power of the light source.

4. An interferometer as recited in claim 3, wherein a portion of the light from the source is directed out of the first coupler through the third port and into the circulator via the second coupler, with the circulator directing the light into the third detector.

5. An interferometer as recited in claim 1, further comprising a beam-splitter as part of the sample path and functioning to direct a portion of the light received from the second port of the first coupler to the sample and direct a portion of light collected upon scattering from the sample to the second port of the second coupler.

6. An interferometer as recited in claim 1, wherein the light illuminates the sample via a path separate from the path through which the scattered light is collected from the sample.

7. An interferometer as recited in claim 1, wherein the first coupler directs more light into the sample path than the reference path.

8. An interferometer as recited in claim 1, wherein the second coupler directs substantially equal portions of the light onto the paths to the first and second detectors.

9. An interferometer as recited in claim 8, wherein a phase difference of about 180 degrees exists between the light output reaching the first and second detectors.

10. An interferometer as recited in claim 8, wherein the first and second output signals are subtracted to isolate an interference signal.

11. An interferometer as recited in claim 1, further comprising means to adjust polarization in one of the sample and reference paths.

12. An interferometer as recited in claim 1, further comprising means to adjust optical delay in one of the sample and reference paths.

13. An interferometer as recited in claim 1, further comprising means to attenuate the light in one of the sample and reference paths.

14. An interferometer as recited in claim 1, further comprising means to variably attenuate the light in one of the sample and reference paths.

15. An interferometer for use in an optical coherence tomography (OCT) system comprising:
a light source;
a first 2×2 coupler having four ports;
a second 2×2 coupler having four ports, with light from the source being coupled to a first port of the first coupler, with the first coupler dividing the light between a first path and a first portion of a second path, with the light exiting the first coupler into the first path from a second port and returning to a second port of the second coupler and with the light exiting the first coupler into the first portion of the second path from a third port and entering the second coupler via a first port, with the light exiting the second coupler into a second portion of the second path from a third port and returning to the second coupler via said third port, wherein one of said first and second paths is a sample path and the other path is a reference path, wherein light in the sample path is scattered from a sample before returning to the second coupler via one of said second and third ports, said first coupler having a fourth port for supplying, via said first port of the second coupler, interfered light returned from both the sample and the reference paths, said second coupler having a fourth port for supplying interfered light returned from both the sample and the reference paths said interfered light containing information about the light scattering properties of the sample.

16. An interferometer as recited in claim 15, further comprising a circulator as part of the first path and functioning to receive light from the second port of the first coupler and direct a portion of the light to the second port of the second coupler.

17. An interferometer as recited in claim 16, wherein the circulator further directs light to a detector for monitoring the power of the light source.

18. An interferometer as recited in claim 17, wherein a portion of the light from the source is directed out of the first coupler through the third port and into the circulator via the second coupler, with the circulator directing the light into the detector.

19. An interferometer as recited in claim 15, further comprising a beam-splitter as part of the first path and functioning to receive light from the second port of the first coupler and direct a portion of light to the second port of the second coupler.

20. An interferometer as recited in claim 15, wherein the light illuminates the sample via a path separate from the path through which the scattered light is collected from the sample.

21. An interferometer as recited in claim 15, wherein the first coupler directs more light into the sample path than the reference path.

22. An interferometer as recited in claim 15, wherein the second coupler directs substantially equal portions of the light into the first and fourth ports.

23. An interferometer as recited in claim 22, wherein a phase difference of about 180 degrees exists between the light output of the first and fourth ports of the second coupler.

24. An interferometer as recited in claim 15, further comprising means to adjust polarization in one of the sample and reference paths.

25. An interferometer as recited in claim 15, further comprising means to adjust optical delay in one of the sample and reference paths.

26. An interferometer as recited in claim 15, further comprising means to attenuate the light in one of the sample and reference paths.

27. An interferometer as recited in claim 15, further comprising means to variably attenuate the light in one of the sample and reference paths.

28. An interferometer as recited in claim 15, further comprising:
a first detector for receiving light from the fourth port of the first coupler and generating first output signals in response thereto; and
a second detector for receiving light from the fourth port of the second coupler and generating second output signals in response thereto.

* * * * *